US012777291B2

(12) United States Patent
Higgins et al.

(10) Patent No.: US 12,777,291 B2
(45) Date of Patent: Oct. 27, 2026

(54) REMOTE-CONTROL MODULE FOR AN EAR-WEARABLE DEVICE

(71) Applicant: Starkey Laboratories, Inc., Eden Prairie, MN (US)

(72) Inventors: Sidney A. Higgins, Maple Grove, MN (US); Kyle Olson, St. Louis Park, MN (US); Andy S. Lin, Chanhassen, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 416 days.

(21) Appl. No.: 18/223,911

(22) Filed: Jul. 19, 2023

(65) Prior Publication Data

US 2024/0031745 A1 Jan. 25, 2024

Related U.S. Application Data

(60) Provisional application No. 63/390,844, filed on Jul. 20, 2022.

(51) Int. Cl.
*H04R 25/00* (2006.01)
*H04R 1/10* (2006.01)

(52) U.S. Cl.
CPC ........... *H04R 25/50* (2013.01); *H04R 1/1041* (2013.01); *H04R 2420/07* (2013.01)

(58) Field of Classification Search
CPC ...... H04R 25/50; H04R 25/55; H04R 25/552; H04R 25/554; H04R 25/556;
(Continued)

(56) References Cited

U.S. PATENT DOCUMENTS 8,248,316 B2 8/2012 Christensen
8,254,606 B2 8/2012 Zhang et al.
(Continued)

OTHER PUBLICATIONS

"Remote Operations Manual," Starkey Hearing Technologies user manual, Dec. 2019 (11 pages).
(Continued)

*Primary Examiner* — Ahmad F. Matar
*Assistant Examiner* — Sabrina Diaz
(74) *Attorney, Agent, or Firm* — Pauly, DeVries Smith & Deffner LLC

(57) ABSTRACT

Embodiments herein relate to ear-wearable devices. In an embodiment, a system is included having an ear-wearable device having a speaker, a microphone, a first processor, a first non-transitory computer memory, and a first wireless communication device. The system can include a remote-control module having remote-control processor, a remote-control wireless communication device, a pressure switch, a inertial measurement unit (IMU), and a remote-control memory. The remote-control memory stores computer instructions for registering a start position of the IMU at an activation time, detecting a first movement of the IMU, and transmitting a first wireless signal related to the first movement to the first wireless communication device. The first memory stores computer instructions for receiving the first wireless signal at the first wireless communication device,
(Continued)

and based on the first wireless signal, changing a first setting of the ear-wearable device. Other embodiments are also included herein.

20 Claims, 17 Drawing Sheets

(58) Field of Classification Search
CPC ................ H04R 25/558; H04R 1/1041; H04R 2420/07; H04R 2225/61
USPC .................................................. 381/315, 312
See application file for complete search history.

(56) References Cited

U.S. PATENT DOCUMENTS 9,247,356 B2 1/2016 Solum et al.
9,439,006 B2 9/2016 Sacha et al.
2013/0154811 A1* 6/2013 Ferren ................ H04N 21/4333 340/12.5
2017/0262065 A1* 9/2017 Elkins ................... G06F 1/1694
2024/0184361 A1* 6/2024 O'Callaghan ........ H04R 1/1041

OTHER PUBLICATIONS

"SurfLink Remote Control," Starkey Hearing Technologies Operations Manual, Dec. 2019 (9 pages).
"Thrive Hearing Control App User Guide," Starkey Hearing Technologies user guide available at www.starkey.com/support/operations-manuals at least as early as Jan. 1, 2023 (19 pages).
"Communication Pursuant to Article 94(3)," for European Patent Application No. 23182023.4, mailed Sep. 16, 2025, 5 pages.
"Reply to Communication Pursuant to Article 94(3)," for European Patent Application No. 23182023.4, filed Dec. 1, 2025, 92 pages.
"Reply to the European Search Opinion," for European Patent Application No. 23182023.4, filed Jul. 11, 2024, 93 pages.
"European Communication per Article 94(3) EPC," for EP Application No. 23182023.4, mailed Sep. 19, 2025 (5 pages).
"Response to Extended European Search Report," for European Patent Application No. 23182023.4, filed Jul. 10, 2024 (92 pages).

* cited by examiner

| Motion Description & Symbol | Control Signal Example | Haptic Cue Example | Audio Cue Example |
|---|---|---|---|
| Press & Hold  | Activates remote mode | Vibration of first length and first frequency | First tone, first verbal statement, or both |
| Double Press & Hold 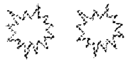 | Change control mode | Two discrete vibration motions | Second tone, verbal statement of the recently-changed control mode, or both |
| Shake along an axis 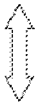 | Change control mode | Vibration motion of second length and second frequency | Second tone, verbal statement of the recently-changed control mode, or both |
| Rotate wrist in clockwise direction  | Move up through parameter settings | In volume control mode: Vibrations of increasing frequency, amplitude, or both<br>In memory control mode: Vibration of third length and frequency | In volume control mode: Third tone of increasing volume, increasing ambient volume, verbal statement of level, or multiple of these<br>In memory control mode: Verbal statement of recently-selected memory mode |
| Rotate wrist in counter-clockwise direction  | Move down through parameter settings | In volume control mode: Vibrations of increasing frequency, amplitude, or both<br>In memory control mode: Vibration of third length and frequency | In volume control mode: Third tone of decreasing volume, decreasing ambient volume, verbal statement of level, or multiple of these<br>In memory control mode: Verbal statement of recently-selected memory mode |
| Rotate arm clockwise  | Turn on a command mode | Vibration of fourth length and fourth frequency | Verbal statement of recently-selected command mode |
| Rotate arm counterclockwise  | Turn off a command mode | Vibration of fourth length and fourth frequency | Verbal statement of recently-deselected command mode |

FIG. 19

REMOTE-CONTROL MODULE FOR AN EAR-WEARABLE DEVICE

This application claims the benefit of U.S. Provisional Application No. 63/390,844, filed Jul. 20, 2022, the content of which is herein incorporated by reference in its entirety.

FIELD

Embodiments herein relate to ear-wearable devices and more particularly to a remote-control module for an ear-wearable device.

BACKGROUND

Ear-wearable devices are electronic instruments worn in or around the ear that compensate for hearing losses by amplifying sound. Ear-wearable devices are capable of operating in a number of different modes which affect how the sound is delivered to the wearer, where a mode is defined by a set of operating parameters. Depending upon the environment and situation, a user may prefer one set of operating parameters over another. Generally, it preferable to design ear-wearable devices to be small in size, light-weight, not readily visible, and relatively low power to avoid frequent replacement of batteries. Such designs are available yet control of such devices can be complicated due to their small size. Accordingly, the present disclosure is directed towards a remote-control module for controlling an ear-wearable device.

SUMMARY

In one general aspect, a system can include an ear-wearable device having a speaker, a microphone, a first processor, a first non-transitory computer memory, and a first wireless communication device. The system can include a remote-control module having a remote-control processor, a remote-control wireless communication device, and a pressure switch, wherein the pressure switch can be configured to have an active state and an inactive state and to enter the active state when at least a threshold pressure can be applied to a switch portion of a remote-control housing exterior. The remote-control module can further include a remote-control inertial measurement unit (IMU) and a remote-control non-transitory computer memory operatively connected to the remote-control processor. The remote-control memory stores computer instructions for registering a start position of the IMU at an activation time when the pressure switch enters the active state, detecting a first movement of the IMU, and transmitting a first wireless signal related to the first movement to the first wireless communication device. The first memory stores computer instructions for receiving the first wireless signal at the first wireless communication device, and based on the first wireless signal, changing a first setting of the ear-wearable device.

Implementations of the general aspect may include one or more of the following features.

The first memory can store further computer instructions for: based on the first wireless signal, playing a first sound file at the speaker, wherein the first sound file provides control information to a wearer of the ear-wearable device.

The control information provided by the first sound file can be one of the group consisting of: an identity of a current control mode of the ear-wearable device, an identity of a recently-changed control mode of the ear-wearable device, a current parameter setting of the ear-wearable device, a recently-changed parameter setting of the ear-wearable device, a current volume setting of the ear-wearable device, a recently-changed volume setting of the ear-wearable device, a current memory mode setting of the ear-wearable device, and a recently-changed memory mode setting of the ear-wearable device.

The first movement can be detected while the pressure switch remains in the active state after entering the active state at the activation time.

The remote-control module further includes a haptic feedback device configured to produce vibration motion, wherein the remote-control memory stores computer instructions for: after detecting that the pressure switch can have entered the active state, activating the haptic feedback device to produce a press-confirming vibration motion.

The remote-control module can further include a haptic feedback device configured to produce vibration motion, wherein the remote-control memory stores computer instructions for: after detecting the first movement of the IMU, activating the haptic feedback device to produce a first-movement confirming vibration motion. The first movement can be one of the group consisting of: a shaking movement, a clockwise rotation movement about an axis of a housing of the remote-control module, a counterclockwise rotation movement about an axis of the housing of the remote-control module, a clockwise rotation movement about an axis external to the housing of the remote-control module, a counterclockwise rotation movement about an axis external to the housing of the remote-control module, an up movement, a down movement, and an acceleration movement. The first movement can be a shaking movement and the first memory stores computer instructions for: upon receiving on the first wireless signal, the ear-wearable device changes from a first control mode to a second control mode.

The first control mode and second control mode can be each selected from the group consisting of a volume control mode, a memory setting mode, and a standby mode.

The first movement can be from a start position to a first position, wherein the remote-control memory stores further computer instructions for: detecting a second movement of the IMU from the first position to a second position, and transmitting a second wireless signal related to the second movement to the first wireless communication device.

The remote-control memory stores further computer instructions for: detecting a double-press sequence can include a first activation, a deactivation, and a second activation of the pressure switch within a first time interval, and transmitting a double-press wireless signal related to the double-press sequence to the first wireless communication device. The first memory can store computer instructions for receiving the double-press wireless signal and playing a sound file correlated to the double-press wireless signal. The ear-wearable device can change from a first control mode to a second control mode based on the double-press wireless signal.

In a general aspect, a system can be included having an ear-wearable device. The ear-wearable device can include a speaker, a microphone, a first processor, a first non-transitory computer memory, and a first wireless communication device. The system can have a remote-control module having a remote-control processor, a remote-control wireless communication device, and a pressure switch. The pressure switch can be configured to have an active state and an inactive state and to enter the active state when at least a threshold pressure can be applied to a switch portion of a remote-control housing exterior. The remote-control module can further include a remote-control inertial measurement unit (IMU), a haptic feedback device configured to provide vibration motion, and a remote-control non-transitory computer memory operatively connected to the remote-control processor. The remote-control memory stores computer instructions for registering a start position of the IMU at an activation time when the pressure switch enters the active state, upon registering the start position, detecting a first movement of the IMU, transmitting a first wireless signal related to the first movement to the first wireless communication device, and after detecting that the pressure switch can have entered the active state, activating the haptic feedback device to produce a press-confirming vibration motion. The first memory stores computer instructions for receiving the first wireless signal at the first wireless communication device, based on the first wireless signal, changing a first setting of the ear-wearable device, and based on the first wireless signal, playing a first sound file at the speaker, wherein the first sound file provides control information to a wearer of the ear-wearable device.

Implementations of the general aspect may include one or more of the following features. The ear-wearable device can include a first wireless communication device and the remote-control module can include a remote-control wireless communication device and a remote-control inertial measurement unit (IMU). The method can include detecting a first movement of the IMU at the remote-control module, transmitting a first wireless signal related to the first movement to the first wireless communication device with the remote-control wireless communication device, receiving the first wireless signal at the first wireless communication device, and based on the first wireless signal, changing a first setting of the ear-wearable device.

The method can include based on the first wireless signal, playing a first sound file at a speaker of the ear-wearable device, wherein the first sound file provides control information to a wearer of the ear-wearable device. The control information provided by the first sound file can be one of the group consisting of: an identity of a current control mode of the ear-wearable device, an identity of a recently-changed control mode of the ear-wearable device, a current parameter setting of the ear-wearable device, a recently-changed parameter setting of the ear-wearable device, a current volume setting of the ear-wearable device, a recently-changed volume setting of the ear-wearable device, a current memory mode setting of the ear-wearable device, and a recently-changed memory mode setting of the ear-wearable device.

The remote-control module further can include a pressure switch, wherein the pressure switch can be configured to have an active state and an inactive state and to enter the active state when at least a threshold pressure can be applied to a switch portion of a remote-control housing exterior. The method can further include registering a start position of the IMU at an activation time when the pressure switch enters an active state, wherein the first movement can be detected while the pressure switch remains in the active state after entering the active state at the activation time.

The remote-control module can further include a haptic feedback device configured to produce vibration motion, and the method further can include: upon detecting that the pressure switch can have entered the active state, activating the haptic feedback device to produce a press-confirming vibration motion. The first movement can be one of the group consisting of: a shaking movement, a clockwise rotation movement about an axis of a housing of the remote-control module, a counterclockwise rotation movement about an axis of the housing of the remote-control module, a clockwise rotation movement about an axis external to the housing of the remote-control module, a counterclockwise rotation movement about an axis external to the housing of the remote-control module, an up movement, a down movement, and an acceleration movement.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 19 is a chart of examples of how different exemplary motions could correlate to wireless control signals, haptic feedback, and audio cues.

While embodiments are susceptible to various modifications and alternative forms, specifics thereof have been shown by way of example and drawings and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

A system including an ear-wearable device and a remote-control module is described herein. The remote-control module can include a housing that is sealed and approximately the size of a quarter. The remote-control module can include a pressure switch that is configured to enter an active state when at least a threshold pressure is applied to a switch portion of a remote-control housing. The remote-control module can include a remote-control inertial measurement unit (IMU) configured to detect one or more motions of the remote-control module performed by a user. The remote-control module can include a remote-control wireless communication device configured to transmit one or more wireless signals related to the detected movement to the ear-wearable device. The ear-wearable device is configured to change one or more parameter settings based on the received wireless signal from the remote-control module.

The remote-control module enables a user to control the ear-wearable device using commands that are slight enough to be successfully done during pocket carry or by other discrete motions. The remote-control module is configured to generate tactile confirmation of a successful command input via a series of vibration outputs that the user can feel a confirmation of their input commands without diverting their visual focus to the remote. Patient customization (key-chain use, neck worn, wallet carry, etc.) is possible due to the relatively small size and thickness of the remote-control module.

Figure 1:
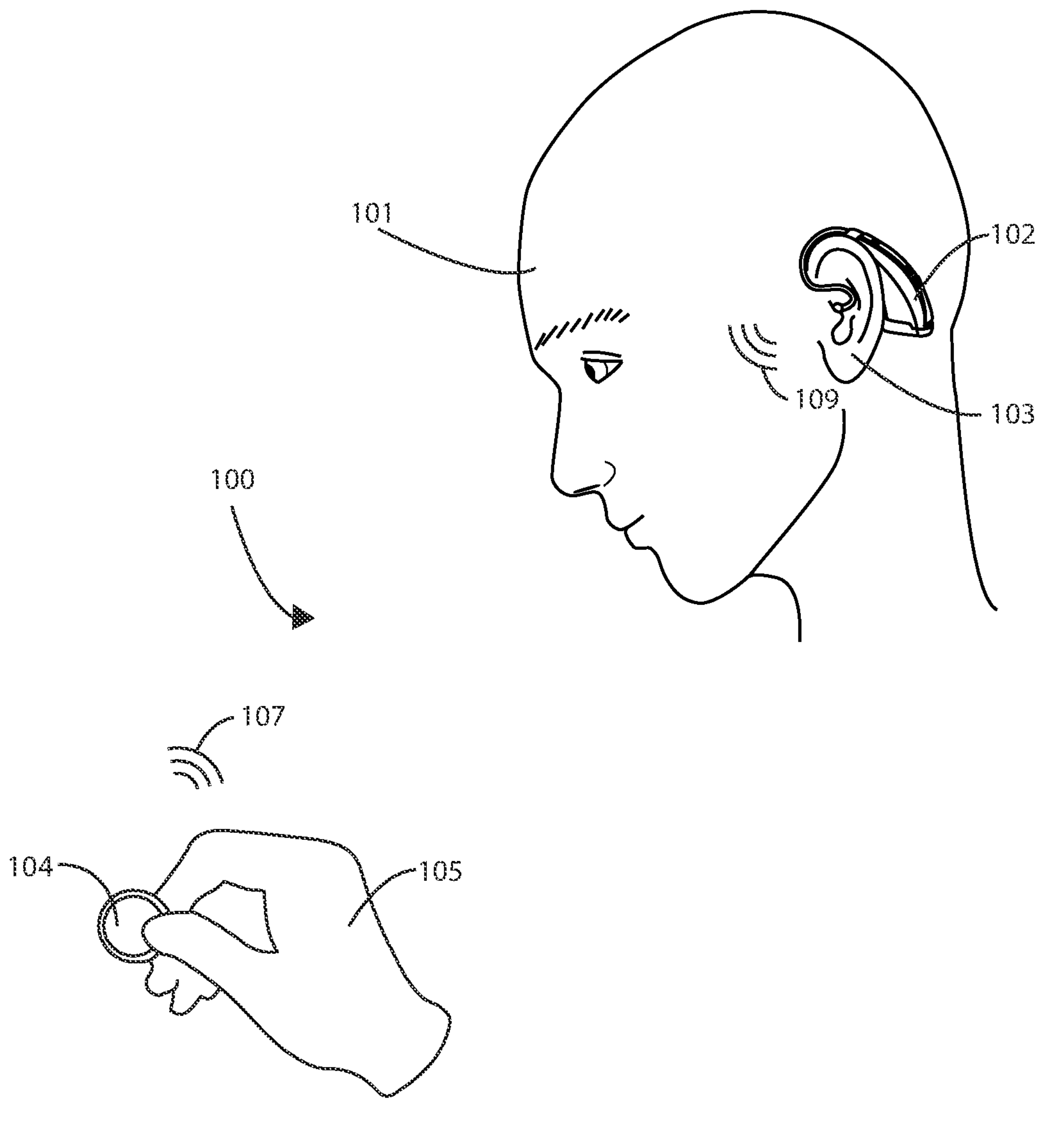
FIG. 1 is a schematic view of a hearing aid system in accordance with various embodiments herein.

Referring now to FIG. 1, a schematic view of a hearing aid system is shown in accordance with various embodiments herein. The hearing aid system 100 can include an ear-wearable device 102 and a remote-control module 104.

The hearing aid system 100 can include one or more ear-wearable devices 102 and a remote-control module 104. The ear-wearable device 102 in the embodiment of FIG. 1 is a behind-the-ear (BTE) type device and thus the components are housed behind an ear 103 of a user 101 with a cable leading to an earbud designed to be placed within an ear canal of the user. However, it is understood that other hearing assistance devices and other hearing aids may be used without departing from the scope of the present subject matter. Such other hearing aids include, but are not limited to, behind-the-ear (BTE), in-the ear (ITE), in-the-canal (ITC), invisible-in-canal (ITC), receiver-in-canal (RIC), receiver in-the-ear (RITE) or completely-in-the-canal (CIC) type hearing aid assemblies or some combination of the above.

The hearing aid system 100 can include a remote-control module 104. The remote-control module 104 is configured to be held in a hand 105 of the user 101. Remote-control module 104 includes a wireless communication device operable to send signals to and receive signals from the ear-wearable device 102. The remote-control module 104 can include one or more input controls. Input controls may vary, and include, but are not limited to, buttons, switches, touch pads, potentiometers, capacitive sensing devices, magnetic sensing devices, optical sensing devices, and combinations of two or more thereof. The number of input controls may vary without departing from the scope of the present subject matter.

In various embodiments, the remote-control module 104 transmits signals 107 to ear-wearable device 102 to perform a variety of functions. One such function is the control of ear-wearable device 102. Such controls include, but are not limited to, one or more of: power on, power off, volume up, volume down, muting on, muting off, adjusting frequency response, triggering a particular functionality, adjusting a plurality of settings (for example, changing between memory modes to adjust several settings at once between stored groups of settings), and combinations thereof. In various embodiments, ear-wearable device 102 transmits signals 109 to the remote-control module 104 to convey a user selection of one or more settings of the ear-wearable device. The signals 107, 109 include, but are not limited to one or more of, acoustic signals, magnetic or near field radio frequency signals, direct audio input signals, far field radio frequency signals, and combinations thereof.

Figure 2:
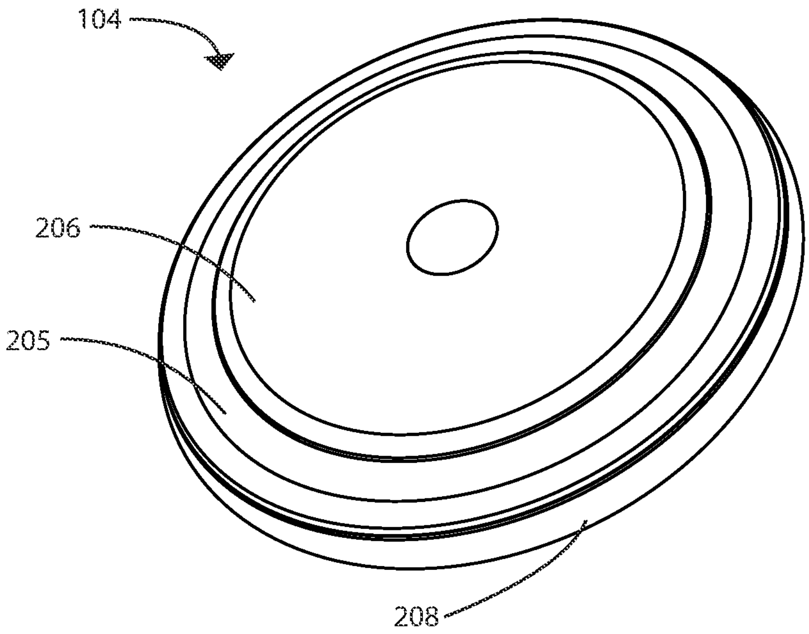
FIG. 2 is a top perspective view of a remote-control module of FIG. 1 in accordance with various embodiments herein.

Referring now to FIG. 2, a top perspective view of a remote-control module of FIG. 1 is shown in accordance with various embodiments herein. In various embodiments, the remote-control module 104 can define a housing 205.

The housing can be formed by a first housing case 206 and a second housing case 208. The first housing case 206 can be constructed from any suitable material or materials. In an embodiment, the first housing case 206 can be constructed from a metallic material or materials including but not limited to stainless steel, bronze, titanium, aluminum, brushed aluminum, and gold. In an embodiment, the first housing case 206 can be constructed from a non-metallic material, such as a polymeric material or materials including but not limited to acrylonitrile butadiene styrene (ABS), a thermally conductive polymer, polycarbonate, polyester, polytetrafluoroethylene (PTFE), perfluoroalkoxy alkane (PFA), and blends of the foregoing materials.

Figure 3:
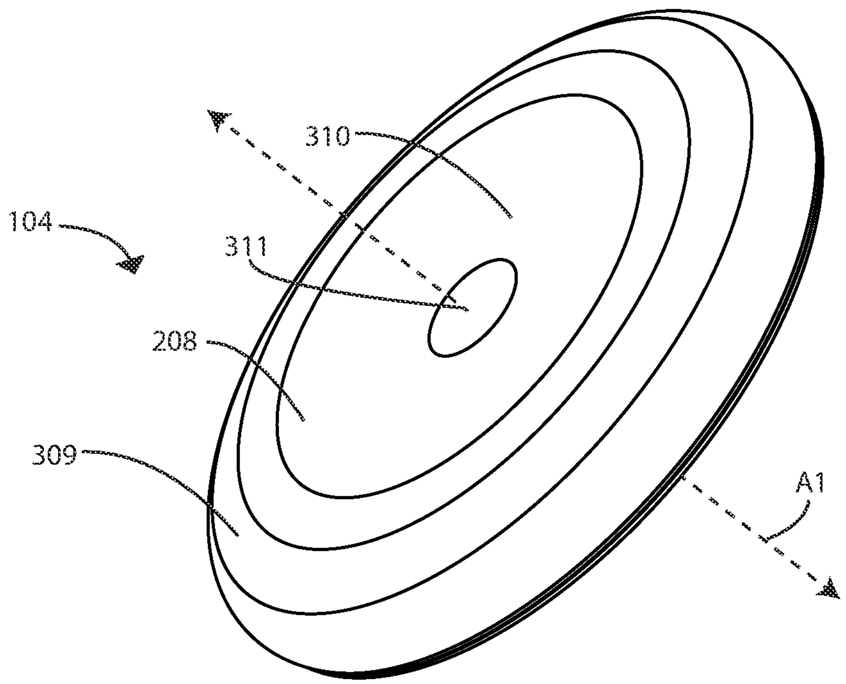
FIG. 3 is a bottom perspective view of the remote-control module of FIG. 1 in accordance with various embodiments herein.

Referring now to FIG. 3, a bottom perspective view of the remote-control module of FIG. 1 is shown in accordance with various embodiments herein, where a second housing case 208 is visible. The second housing case 208 can be constructed from any suitable material or materials. In an embodiment, the second housing case 208 can be constructed from a non-metallic material, such as a polymeric material or materials including but not limited to acrylonitrile butadiene styrene (ABS), a thermally conductive polymer, polycarbonate, polyester, polytetrafluoroethylene (PTFE), perfluoroalkoxy alkane (PFA), and blends of the foregoing materials.

In one embodiment, at least one of the first housing case 206 and second housing case 208 is non-metallic. In one embodiment, both of the first housing case 206 and second housing case 208 are non-metallic. Including at least one non-metallic housing case component facilitates transmission of wireless signals from the remote-control module 104.

In various embodiments, the second housing case 208 can include an outer rim 309 and a concave portion 310. In the embodiment of FIG. 3, the second housing case 208 is axially symmetric about axis A1 and the outer rim 309 defines a circular outer perimeter of the second housing case 208 surrounding the concave portion 310. In various embodiments, the concave portion 310 is concave in shape with the outer perimeter of the concave portion flush with the outer rim 309. The concave portion 310 can be axially symmetric about axis A1 and can converge to a vertex 311 at axis A1.

Referring now to FIGS. 2-3, in various embodiments, an outer surface of the housing 205 is axially symmetric about a central axis A1, which is shown in FIG. 3. In various embodiments, the housing has an outer perimeter that is substantially circular. In various embodiments, a cross section of the housing taken along a plane that is perpendicular to the central axis A1 has an outer perimeter that is substantially circular. In various embodiments, all cross sections of the housing taken along planes that are perpendicular to the central axis have an outer perimeter that is substantially circular.

In alternative embodiments, the housing 205 is not axially symmetric about a central axis. For instance, housing 205 could be substantially circular in cross section, but include one or more protrusions, notches, or both protrusions and notches along the circle. The housing 205 could be any number of shapes such as having a perimeter that is oval, triangular, square, rectangular, or the like. In some embodiments, the housing 205 could contain one or more holes or openings. For example, housing 205 could contain a hole sized for facilitating attachment to a keychain, necklace, lanyard, bracelet, or other structure.

Figure 4:
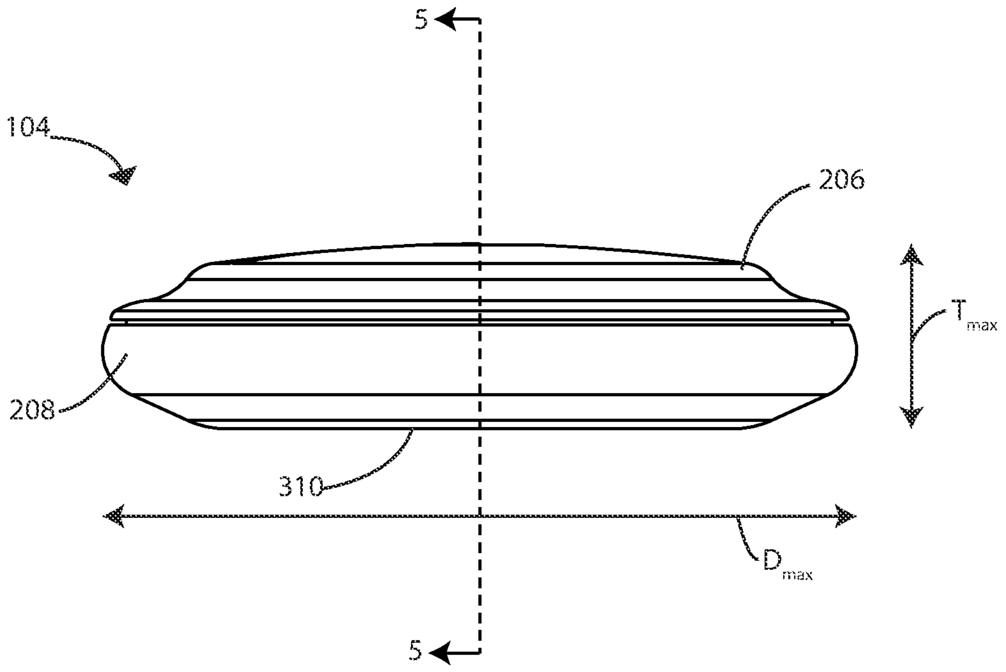
FIG. 4 is a front view of the remote-control module of FIG. 1 in accordance with various embodiments herein.

Referring now to FIG. 4, a front view of the remote-control module of FIG. 1 is shown in accordance with various embodiments herein. In various embodiments, the housing 205 has a maximum diameter $D_{max}$ and a maximum thickness $T_{max}$. In various embodiments, the maximum diameter $D_{max}$ is approximately the diameter of a quarter. In some embodiments, the maximum diameter $D_{max}$ can be greater than or equal to 15, 16, 18, 19, or 20 mm. In some embodiments, the maximum diameter $D_{max}$ can be less than or equal to 25, 24, 22, 21, or 20 mm. In some embodiments, the maximum diameter $D_{max}$ can fall within a range of 15 to 25 mm, or 16 to 24 mm, or 18 to 22 mm, or 19 to 21 mm, or can be about 20 mm. In some embodiments, the maximum thickness $T_{max}$ can be greater than or equal to 3 mm, 4 mm, or 5 mm. In some embodiments, the maximum thickness $T_{max}$ can be less than or equal to 7 mm, 6 mm, or 5 mm. In some embodiments, the maximum thickness $T_{max}$ can fall within a range of 3 mm to 7 mm, or 4 mm to 6 mm, or can be about 5 mm.

Figure 5:
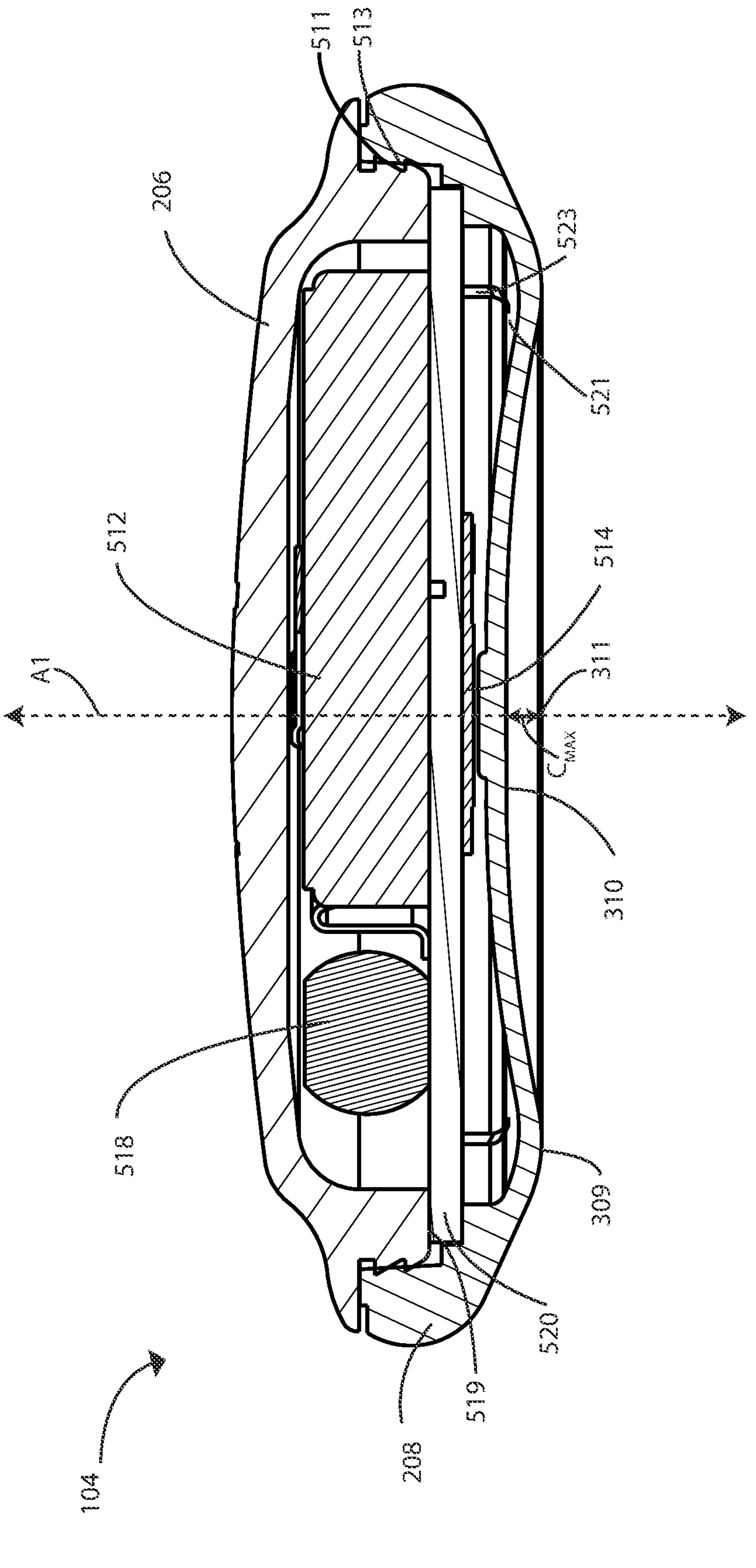
FIG. 5 is a cross-sectional view of the remote-control module of FIG. 4 taken along line 5-5 in accordance with various embodiments herein.

Referring now to FIG. 5, a cross-sectional view of the remote-control module of FIG. 4 taken along line 5-5 is shown in accordance with various embodiments herein. The remote-control module 104 can include a housing 205 defined by a first housing case 206 and a second housing case 208. As described above, the housing 205 is axially symmetric about axis A1 and the concave portion 310 of the second housing case 208 converges to a vertex 311 at axis A1. The concave portion 310 can have a maximum depth $C_{max}$ defined herein as the vertical difference in height between the lowermost surface of the second housing case in the orientation of FIG. 5 and the vertex of the concave portion. Another way of describing the maximum depth of the concave portion 310 is the distance between the vertex 311 and a plane that is perpendicular to axis A1 and intersects an outer surface of the outer rim 309. In some embodiments, the maximum depth can be greater than or equal to 0.25, 0.33, 0.42, or 0.50 mm. In some embodiments, the maximum depth can be less than or equal to 1.00, 0.83, 0.67, or 0.50 mm. In some embodiments, the maximum depth can fall within a range of 0.25 to 1.00 mm, or 0.33 to mm, or 0.42 to 0.67 mm, or can be about 0.50 mm.

In various embodiments, the first housing case is permanently connected to the second housing case, such that the first housing case 206 cannot be separated from the second housing case 208 without destroying the remote-control module 104. In the exemplary embodiment of FIG. 5 the connection between the first housing case 206 and the second housing case 208 is made by serrations 511 of the first housing case biting into a receiving surface 513 of the second housing case. In various embodiments, the first housing case 206, its serrations 511, or both are made of a metallic material while the second housing case 208, its receiving surface 513, or both are made of a plastic material.

Other means of permanent connection between the first housing case and second housing case are possible, such as heat welding, sonic welding, ultrasonic welding, or the use of a permanent adhesive. In some embodiments, the first housing case 206 can be removably connected to the second housing case 208, such that the first housing case 206 can be separated from the second housing case 208 without destroying the remote-control module 104. Options for removably connecting the first and second housing case include a friction fit, a friction fit with a release latch, a hatch with a fastener such as a screw, or other mechanical interface.

In various embodiments, the remote-control module 104 contains one or more components within housing 205. The example of FIG. 5 depicts a power supply 512, pressure switch 514, and haptic feedback device 518, each housed on a circuit board 520 contained in the housing 205 of remote-control module 104. It should be understood that the arrangement of FIG. 5 is for illustrative purposes and that the remote-control module 104 can contain any suitable number and/or configuration of components.

Figure 6:
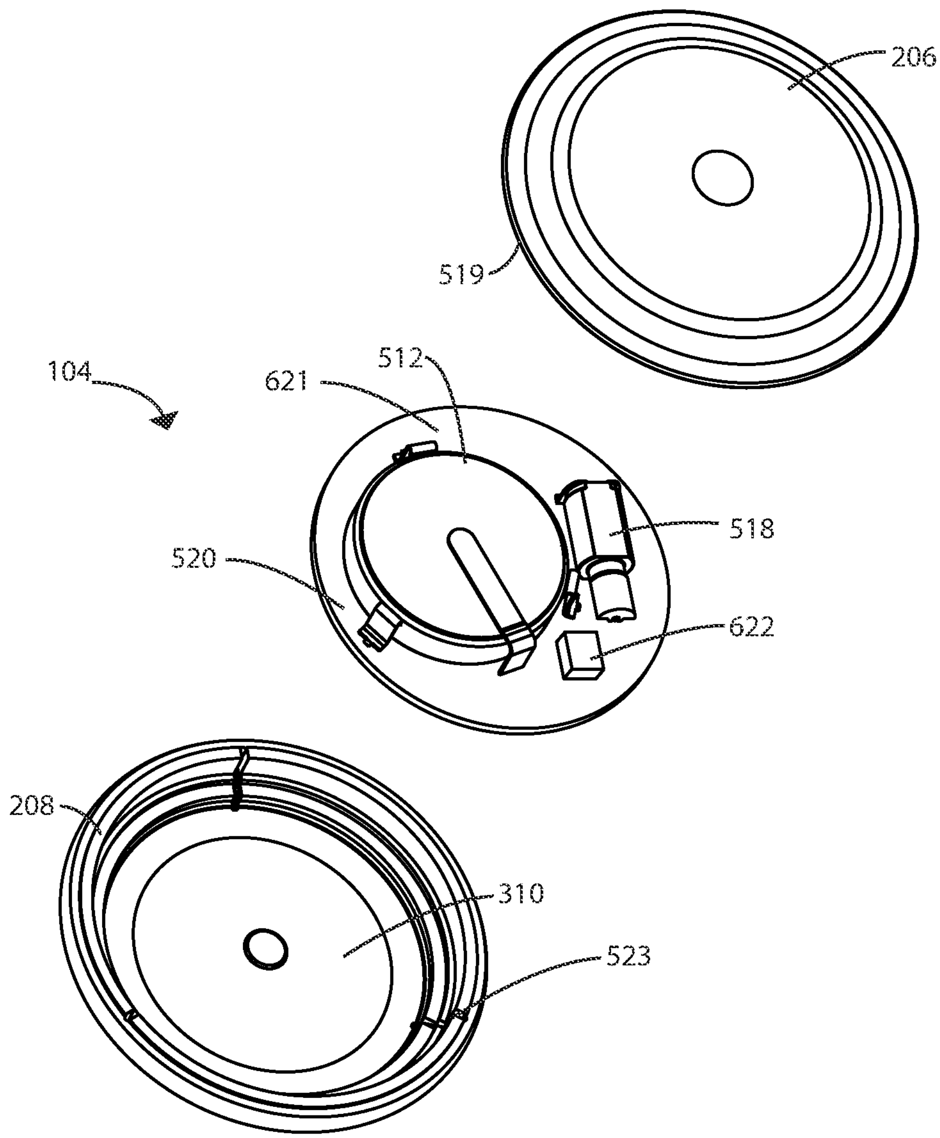
FIG. 6 is an exploded view of the remote-control module of FIG. 1 in accordance with various embodiments herein.

Referring now to FIG. 6, an exploded view of the remote-control module of FIG. 1 is shown in accordance with various embodiments herein. As depicted by FIG. 6, the circuit board 520 is configured to fit between the top and bottom housing. FIG. 6 shows a first side 621 of circuit board 520. The first side 621 of the circuit board 520 can include one or more components including, but not limited to a power supply 512, inertial measurement unit 622 (referred to herein as an IMU), and a haptic feedback device 518.

In various embodiments, the first side 621 of circuit board 520 board is sealed from the environment by an inner surface 519 (best seen in FIG. 5) of the first housing case 206 when the remote-control module 104 is in its assembled state. While not intending to be bound by theory and not describing all situations, it is believed, that sealing in the first side 621 of the circuit board 520 will reduce contamination and increase the lifespan of the electrical components housed on the circuit board.

In various embodiments, the second housing case 208 contains one or more barometric vents 523 configured to vent the second side of the circuit board (not shown in this view) such that the second side of the circuit board is in fluid communication with the ambient environment. In various embodiments, the barometric vents 523 extend into an air gap 521 between the second side of the circuit board and the second housing case 208. In some embodiments, the second side of the circuit board contains a pressure switch 514. While not intending to be bound by theory and not describing all situations, it is believed, that venting the second side of the circuit board can prevent the second housing case 208 from compressing onto the pressure switch 514 in situations where the ambient air pressure varies (e.g., when riding on an airplane). In the embodiment of FIG. 6, the second housing case 208 contains three barometric vents 523, however any suitable number of barometric vents 523 are conceivable. In some embodiments, the number of vents can be greater than or equal to 1, 2, 3, 4, or 5 barometric vents 523, or can be an amount falling within a range between any of the foregoing.

Figure 7:
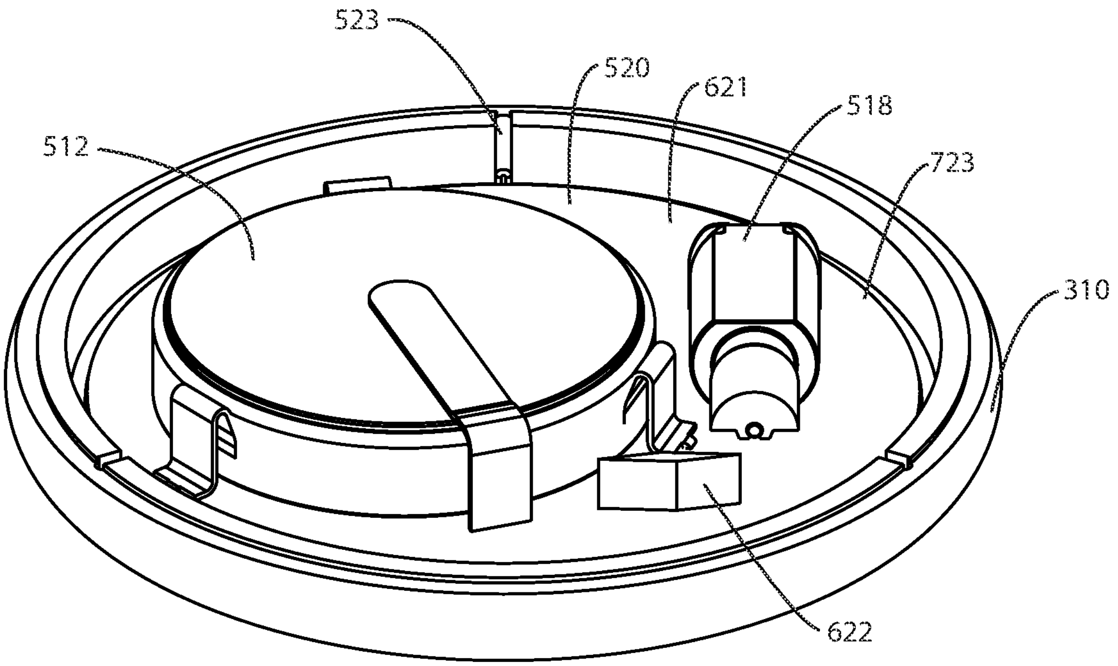
FIG. 7 is a perspective view of the remote-control module of FIG. 1 with the first housing case removed, in accordance with various embodiments herein.

Referring now to FIG. 7, a perspective view of the remote-control module of FIG. 1 with the first housing case removed is shown in accordance with various embodiments herein. The circuit board 520 can be disposed in the second housing case 208 such that circuit board 520 is axially centered relative to the second housing case 208 and the first side 621 of the circuit board faces away from the second housing case. In various embodiments, an outer perimeter 723 of the first side 621 of circuit board 520 board is sealed from the environment by an inner surface 519 (best seen in FIG. 5) of the first housing case 206 and the barometric vents 523 extend below the circuit board when the remote-control module 104 is in its assembled state.

Figure 8:
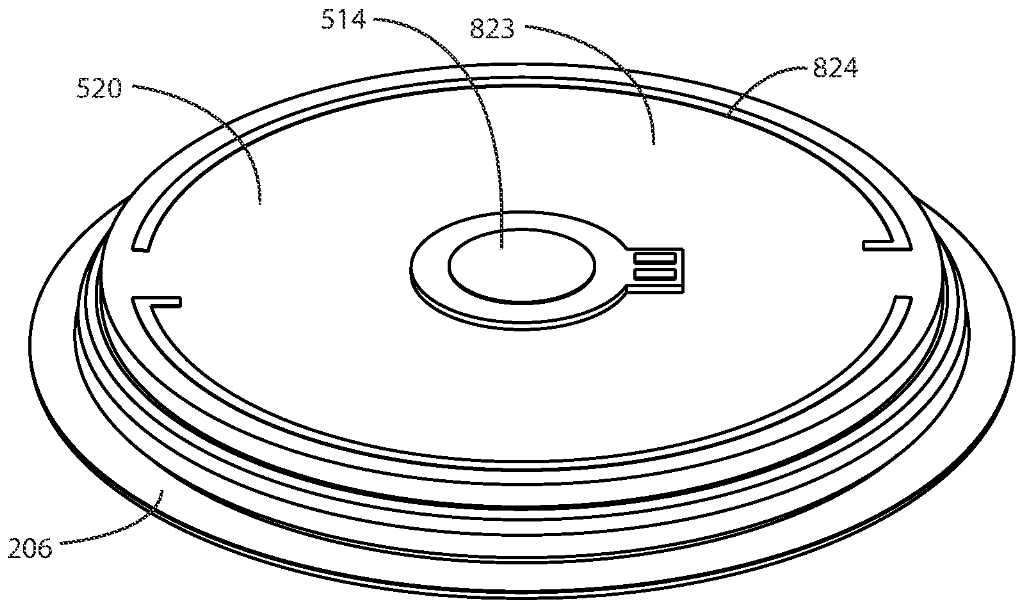
FIG. 8 is a perspective view of the remote-control module of FIG. 1 with the second housing case removed, in accordance with various embodiments herein.

Referring now to FIG. 8, a perspective view of the remote-control module of FIG. 1 with the second housing case removed is shown in accordance with various embodiments herein. The circuit board 520 can be disposed on the first housing case 206 such that circuit board is axially centered relative to the first housing case and the second side 823 faces away from the first housing case 206. In various embodiments, the second side 823 of circuit board can contain one or more components, including, but not limited to a pressure switch 514 and a wireless communication device 824 for a remote-control wireless communication device. In various embodiments, the pressure switch is positioned at the center of the circuit board, such that the center of pressure switch 514 is substantially aligned with the vertex 311 of the concave portion 310 of the second housing case 208 when the remote-control module 104 is in its assembled state (see FIG.

The wireless communication device 824 of the remote-control wireless communication device can be a radio frequency antenna, but other wireless communication devices are contemplated and described herein.

IMU

In various embodiments, the remote-control module 104 contains an IMU 622. As used herein the term "inertial measurement unit" or "IMU" shall refer to an electronic device that can generate signals related to a body's specific force and/or angular rate. IMUs herein can include one or more accelerometers (3, 6, or 9 axis) to detect linear acceleration, a gyroscope to detect rotational rate, or both. In some embodiments, in the alternative or in addition, an IMU includes a magnetometer to detect a magnetic field. As will be described in greater detail herein, the IMU 622 is configured to detect one or more motions of the remote-control module 104. In various embodiments, the remote-control module 104 is configured to transmit one or more wireless signals related to the detected motion(s) to the ear-wearable device 102 using the remote-control module wireless communication device 824.

In alternative embodiments, the remote-control module 104 does not have an IMU and the remote-control module 104 is configured detect one or more actuations of the pressure switch and to transmit one or more wireless signals related to the pressure switch actuation(s) to the ear-wearable device 102 using the remote-control module wireless communication device 824.

Haptic Device

In various embodiments, the remote-control module 104 contains a haptic feedback device 518. As used herein the term haptic feedback device refers to any device that can create an experience of touch by applying forces, vibrations, or motions to the user. Haptic feedback device 518 is configured to register actuations of the pressure switch 514 and/or motions of the remote-control module 104 and generate a vibration motion corresponding to the detected vibrations and/or motions. Any suitable transducer, motor, or other components can be utilized for the haptic device that provides a sensory stimulus to the user. In various embodiments, the remote-control module 104 is configured to provide tactile confirmation of a successful command input via a one, two, or a series of vibration outputs that the user can feel without diverting their focus to the remote-control module. In various embodiments, a predetermined vibratory response from the remote-control module 104 correlates to voice commands the user hears from ear-wearable device 102 which confirms the action/command the user is doing with the remote-control module 104.

In some embodiments, the first housing case 206 is constructed from one or more metallic materials. While not intending to be bound by theory, it is believed that metallic materials used for first housing case 206 are particularly effective in transmitting the vibrations from the haptic feedback device 518 to the hand of the user.

Pressure Switch

In various embodiments, the remote-control module 104 contains a pressure switch 514. As used herein the term pressure switch is defined as any switch that operates an electrical contact when a certain set pressure has been reached on its input. Pressure switches may be designed to make contact either on pressure rise or on pressure fall.

In an embodiment, pressure switch 514 is configured to have an active state and an inactive state and to enter the active state when at least a threshold pressure is applied to a switch portion of an exterior of housing 205. In various embodiments, the pressure switch 514 is positioned at the center of the circuit board, such that the center of pressure switch 514 is substantially aligned with the vertex 311 of the concave portion 310 of the second housing case 208 when the remote-control module 104 is in its assembled state, as shown in FIG. 5. In such embodiments, the concave portion of the second housing case 208 functions as the switch portion. While not intending to be bound by theory, it is believed that having the concave portion 310 of the second housing case 208 function as the switch portion reduces the required movement to actuate the pressure switch 514 compared to prior art remote control modules, allowing more discrete use and other advantages. Moreover, the concave design of the second housing case 208 is believed to reduce the incidence of unintentional actuations of the pressure switch 514 during handling or pocket carry of the remote-control module 104.

Ear-Wearable Devices

Figure 9:
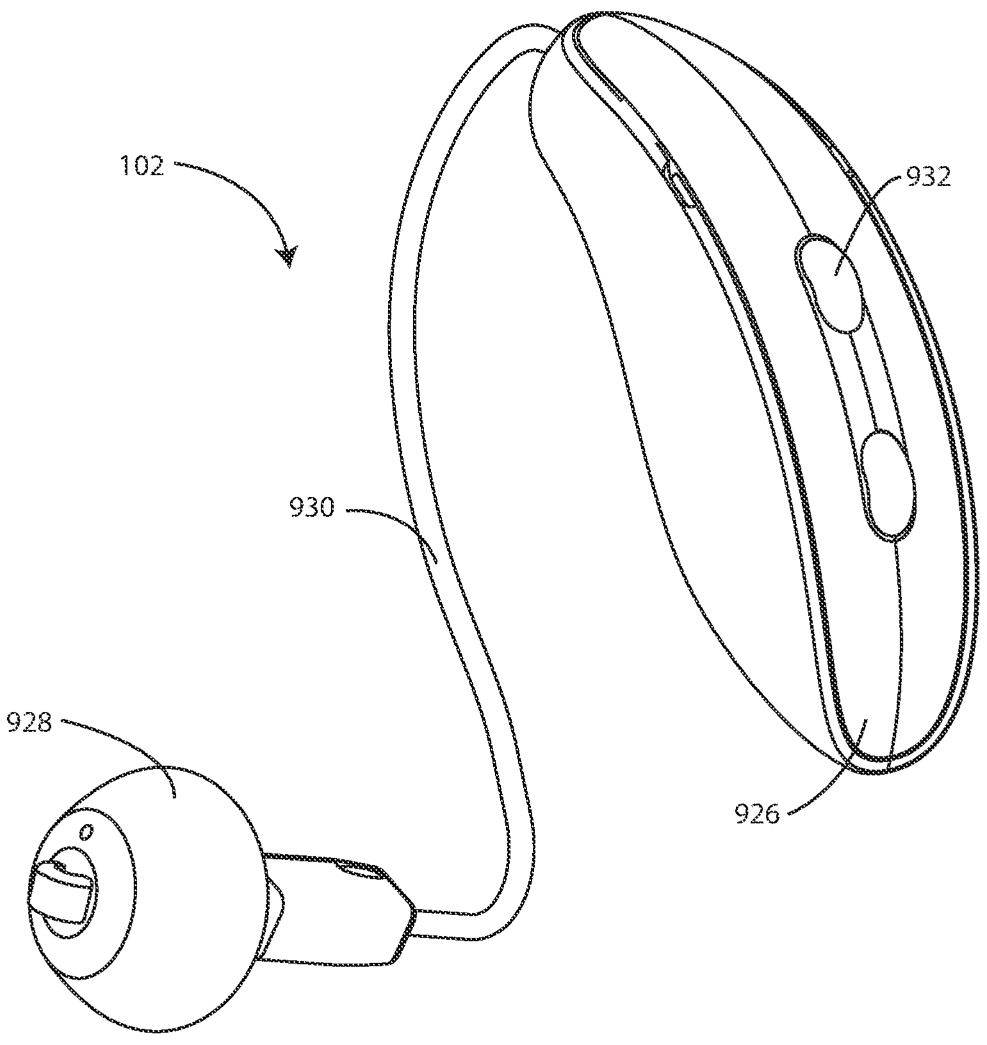
FIG. 9 is a perspective view of an ear-wearable device in accordance with various embodiments herein.

Referring now to FIG. 9, a perspective view of an ear-wearable device is shown in accordance with various embodiments herein. The term "ear-wearable device" as used herein shall refer to devices that can aid a person with impaired hearing. The term "ear-wearable device" shall also refer to devices that can produce optimized or processed sound for persons with normal hearing. The terms ear-wearable device and hearing aid assemblies can be used interchangeably. Hearing aid assemblies herein can include hearables (e.g., wearable earphones, headphones, earbuds, virtual reality headsets), hearing aids (e.g., hearing instruments), cochlear implants, and bone-conduction devices, for example. Hearing aid assemblies include, but are not limited to, behind-the-ear (BTE), in-the ear (ITE), in-the-canal (ITC), invisible-in-canal (ITC), receiver-in-canal (RIC), receiver in-the-ear (RITE) or completely-in-the-canal (CIC) type hearing aid assemblies or some combination of the above. In some embodiments, the hearing aid assemblies may comprise a contralateral routing of signal (CROS) or bilateral microphones with contralateral routing of signal (BiCROS) amplification system. In some embodiments herein, an ear-wearable device may also take the form of a piece of jewelry, including the frames of glasses, which may be attached to the head on or about the ear. The structures and components described herein can also be used in an ear-wearable device that is not a hearing assistance device, such as a medical monitoring device.

The ear-wearable device 102 in the embodiment of FIG. 9 is a behind-the-ear (BTE) type device and thus the components are housed behind the ear with a cable leading to an earbud designed to be placed within an ear canal of a wearer. The ear-wearable device 102 can include a housing 926. In various embodiments, the housing 926 is adapted to be worn on or behind an ear of a wearer. The housing 926 is configured to rest against a user's outer ear in a behind-the-ear orientation. The housing 926 can be manufactured utilizing any suitable technique or techniques, e.g., injection-molding, 3D printing, etc. The housing 926 can include any suitable material or materials, e.g., silicone, urethane, acrylates, flexible epoxy, acrylated urethane, and combinations thereof. The ear-wearable device 102 can further include an earbud 928 configured to be worn in the ear canal of the user. Any suitable earbud 928 can be utilized with the ear-wearable device 102. In some examples, the earbud 928 can be a custom-fit earmold or a dome style earbud that doesn't block the entire ear canal opening of the wearer. The earbud 928 can be operatively connected to the electronic components housed in the housing 926 using any suitable technique or techniques. The ear-wearable device 102 can further include a cable 930 or connecting wire. The cable 930 can include one or more electrical conductors and provide electrical communication between components inside of the housing 926 and the earbud 928. In one or more embodiments, the earbud 928 can be operatively connected to the electronic components disposed within the housing by a cable 930 forming a sound tube that extends between the earpiece and the housing 926. The housing 926 can also define openings for or include input devices 932, such as buttons or dials.

Figure 10:
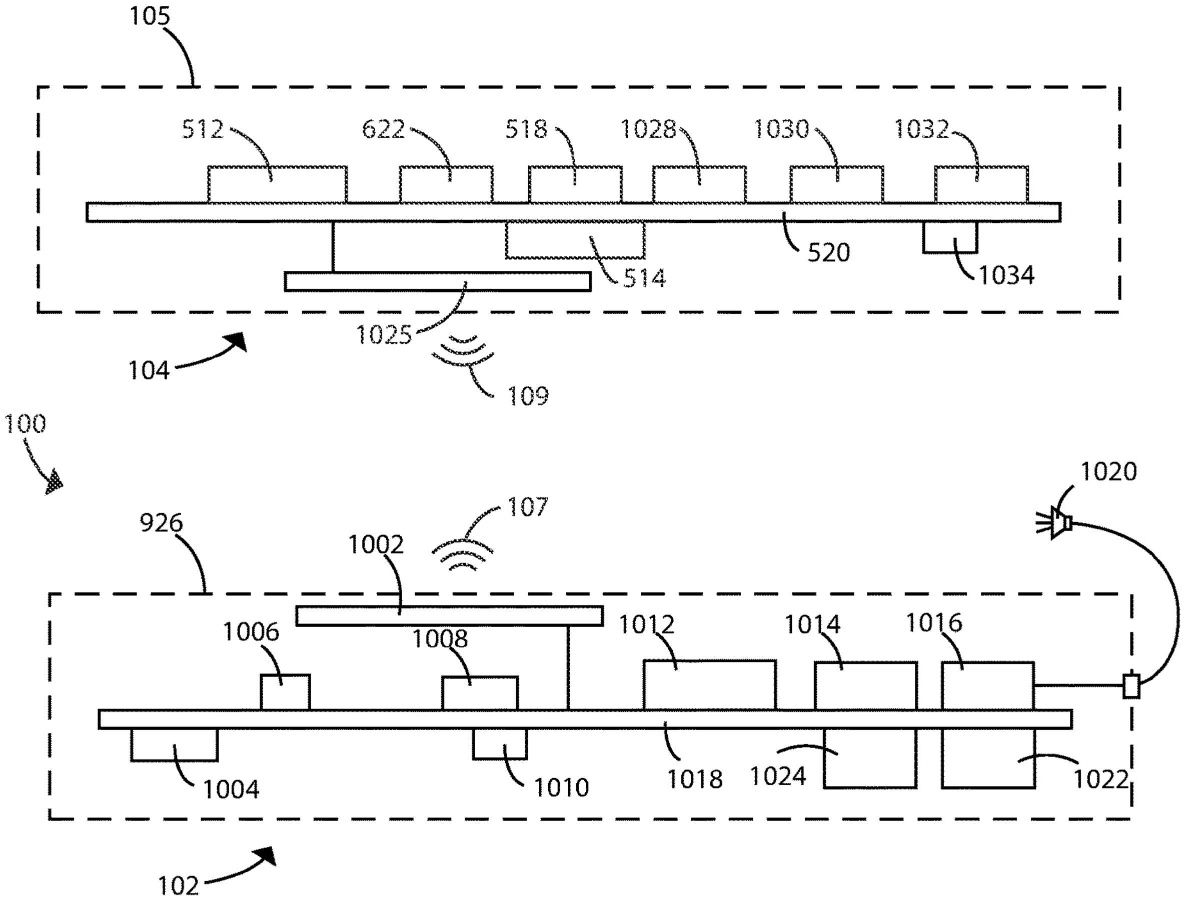
FIG. 10 is a schematic block diagram of a hearing aid system 100 in accordance with various embodiments herein.

Schematic of Hearing Aid System (FIG. 10)

Referring now to FIG. 10, a schematic block diagram is shown with various components of a hearing aid system 100 in accordance with various embodiments, including an ear-wearable device 102 and a remote-control module 104.

The ear-wearable device 102 shown in FIG. 10 includes several components electrically connected to a circuit board 1018 (e.g., flexible mother board) which is disposed within housing 926. Although a single circuit board 1018 is shown in schematic view of FIG. 10, in various embodiments, the components illustrated in FIG. 10 may be connected to two or more circuit boards.

A power supply circuit 1004 can include a battery and can be electrically connected to the circuit board 1018 and provides power to the various components of the ear-wearable device 102. One or more microphones 1006 are electrically connected to the circuit board 1018, which provides electrical communication between the microphones 1006 and a digital signal processor (DSP) 1012. Among other components, the DSP 1012 incorporates or is coupled to audio signal processing circuitry configured to implement various functions described herein. A sensor package 1014 can be coupled to the DSP 1012 via the circuit board 1018. The sensor package 1014 can include one or more different specific types of sensors including, but not limited to pressure sensors, temperature sensors, motion sensors, and biometric sensors. One or more user switches 1010 (e.g., on/off, volume, mic directional settings) are electrically coupled to the DSP 1012 via the circuit board 1018.

An audio output device 1016 is operatively connected to the DSP 1012 via the circuit board 1018. In some embodiments, the audio output device 1016 comprises a speaker (coupled to an amplifier). In other embodiments, the audio output device 1016 comprises an amplifier coupled to an external receiver 1020 adapted for positioning within an ear of a wearer. The external receiver 1020 can include a transducer, speaker, or loudspeaker. In various embodiments, the external receiver 1020 can be positioned within the earbud 928 of FIG. 9 and connected with the remainder of the ear-wearable device 102 via the cable 930 of FIG. 9. It will be appreciated that external receiver 1020 may, in some embodiments, be an electrode array transducer associated with a cochlear implant or brainstem implant device. The hearing aid system 100 may incorporate a communication device 1008 coupled to the circuit board 1018 and to an antenna 1002 directly or indirectly via the circuit board 1018. The communication device 1008 can be a Bluetooth® transceiver, such as a BLE (Bluetooth® low energy) transceiver or another transceiver (e.g., an IEEE 802.11 compliant device). The communication device 1008 can be configured to communicate with one or more external devices in accordance with various embodiments. In various embodiments, the communication device 1008 can be configured to communicate with an external visual display device such as a smart phone, a video display screen, a tablet, a computer, or the like. In various embodiments, the communication device 1008 can be configured to communicate with one or more remote-control devices such as remote-control module 104.

In various embodiments, the hearing aid system 100 can also include a control circuit 1022 and a memory storage device 1024. The control circuit 1022 can be in electrical communication with other components of the device. The control circuit 1022 can execute various operations, such as those described herein. The control circuit 1022 can include various components including, but not limited to, a microprocessor, a microcontroller, an FPGA (field-programmable gate array) processing device, an ASIC (application specific integrated circuit), or the like. The memory storage device 1024 can include both volatile and non-volatile memory. The memory storage device 1024 can include ROM, RAM, flash memory, EEPROM, SSD devices, NAND chips, and the like. The memory storage device 1024 can store computer instructions for executing the steps and methods described herein. The memory storage device 1024 can be used to store data from sensors as described herein and/or processed data generated using data from sensors as described herein. The memory storage device 1024 can store audio files to be played using the speaker to provide the user with information about use of the remote-control module, instructions for responding to wireless signals from the remote-control module, and many other types of files.

The remote-control module 104 is shown schematically with several components electrically connected to circuit board 520 which is disposed within housing 205. Although a single circuit board 520 is shown in schematic view of FIG. 10, in various embodiments, the components illustrated in FIG. 10 may be connected to two or more circuit boards in any suitable configuration. Power supply 512 can be electrically connected to the circuit board and provides power to the various components of the remote-control module 104. In various embodiments the power supply 512 can include one or more batteries. In some embodiments, the power supply 512 is configured to be rechargeable. Alternatively, the power supply 512 can be a single use battery configured to last for an extended period time. In some embodiments, the lifespan of the power supply 512 can be greater than or equal to 6 months, 1 year, 3 years, or 5 years, or can be an amount falling within a range between any of the foregoing. In some embodiments, the power supply 512 is configured to be replaceable. Alternatively, the remote-control module 104 can be disposed of and replaced when the power supply 512 loses it charge.

The remote-control module 104 can further include remote-control processor 1030 and a remote-control non-transitory computer memory 1032 operatively connected to the remote-control processor 1030. The remote-control processor 1030 can include one or more of a microprocessor, a microcontroller, an FPGA (field-programmable gate array) processing device, an ASIC (application specific integrated circuit), or the like. The memory storage device 1024 can include both volatile and non-volatile memory. The memory storage device 1024 can include ROM, RAM, flash memory, EEPROM, SSD devices, NAND chips, and the like. The memory storage device 1032 can store computer instructions for executing the steps and methods described herein. The memory storage device 1024 can be used to store data from sensors as described herein and/or processed data generated using data from sensors as described herein, including, but not limited to, information regarding one or more settings of the ear-wearable device predefined motion patterns of the IMU, instructions for controlling the ear-wearable device 102, and the like.

The remote-control module 104 can further include remote-control wireless communication device 1025. The remote-control wireless communication device 1025 can be configured to communicate with one or more external devices, such as one or more ear-wearable devices. The remote-control wireless communication device can include a transmitter, a receiver, and wireless communication device 824, for example, an antenna, of FIG. 8.

In various embodiments, the remote-control module 104 transmits signals 107 to ear-wearable device 102 to perform a variety of functions. One such function is the control of ear-wearable device 102. Such controls include, but are not limited to, one or more of: power on, power off, volume up, volume down, muting on, muting off, adjusting frequency response, triggering a particular functionality, adjusting a plurality of settings, and combinations thereof. In various embodiments, ear-wearable device 102 transmits signals 109 to the remote-control module 104 to convey one or more settings of the ear-wearable device. The signals 107, 109 include, but are not limited to one or more of, acoustic signals, magnetic or near field radio frequency signals, direct audio input signals, far field radio frequency signals, and combinations thereof.

Remote-control module 104 is configured to transmit signals 107 via remote-control wireless communication device 1025. In acoustic transmission embodiments, remote-control wireless communication device is a speaker. In magnetic transmission embodiments, remote-control wireless communication device is an inductive transmission circuit. In radio frequency transmission embodiments, remote-control wireless communication device is a radio frequency transmitter. It is understood that in various embodiments, remote-control module 104 may have two or more of the foregoing transmission means.

The remote-control module 104 can further include one or more microphones 1028 configured to pick up sounds from its surroundings. The sound received from microphone 1028 may be relayed to the ear of a user (e.g., via a hearing aid receiver) via the remote-control wireless communication device 824.

A sensor package 1034 can be coupled to the processor 1030 via the circuit board 520. The sensor package 1034 can include one or more different specific types of sensors. One example of a sensor is a barometric pressure sensor to measure ambient air pressure. Ambient air pressure decreases with height. As a result, a barometric pressure sensor can provide height information to the processor 1030. The height information can be used to track up/down velocity motions in combination with the IMU.

Figure 11:
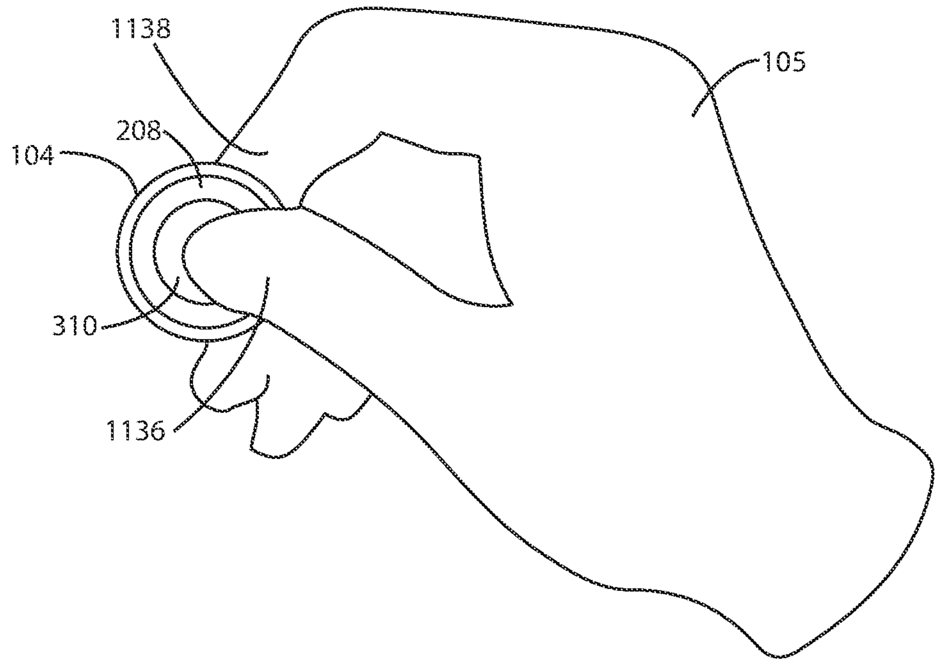
FIG. 11 is a perspective view of the remote-control module being held by a user in accordance with various embodiments herein.

Referring now to FIG. 11, a perspective view of the remote-control module being held by a user is shown in accordance with various embodiments herein. In various embodiments, the remote-control module 104 is configured to be held in a hand 105 of a user. In the example of FIG. 11, the remote-control module 104 is gripped between a thumb 1136 and an index finger 1138 of the user. A squeeze between the thumb and index finger activates the pressure switch 514, which in turn causes the wireless communication device 824 to connect the remote-control module 104 to the ear-wearable device 102 and transmit a signal that the pressure switch 514 has been activated. Once communication between the remote-control module 104 and ear-wearable device 102 is initiated, the remote-control module can control the ear-wearable device using one or more motions as will be described in further detail herein.

In the example of FIG. 11, the remote-control module 104 is held such that the index finger 1138 is in contact with the first housing case 206 and the thumb is in contact with the second housing case 208. In an embodiment, thumb 1136 is configured to sit within the concave portion 310 of the second housing case 208. Referring back to FIG. 5, the concave portion 310 of the second housing case 208 registers or helps the user position the thumb over the pressure switch 514.

Communication Between the Remote and the Ear-Wearable Device

Many different methods are contemplated herein, including, but not limited to, methods of making, methods of controlling, methods of using, and the like. Aspects of system/device operation described elsewhere herein can be performed as operations of one or more methods in accordance with various embodiments herein.

In various embodiments, operations described herein and method steps can be performed as part of a computer-implemented method executed by one or more processors of one or more computing devices. In various embodiments, operations described herein and method steps can be implemented using instructions stored on a non-transitory, computer-readable medium that, when executed by one or more processors, cause a system to execute the operations and/or steps.

Figure 12:
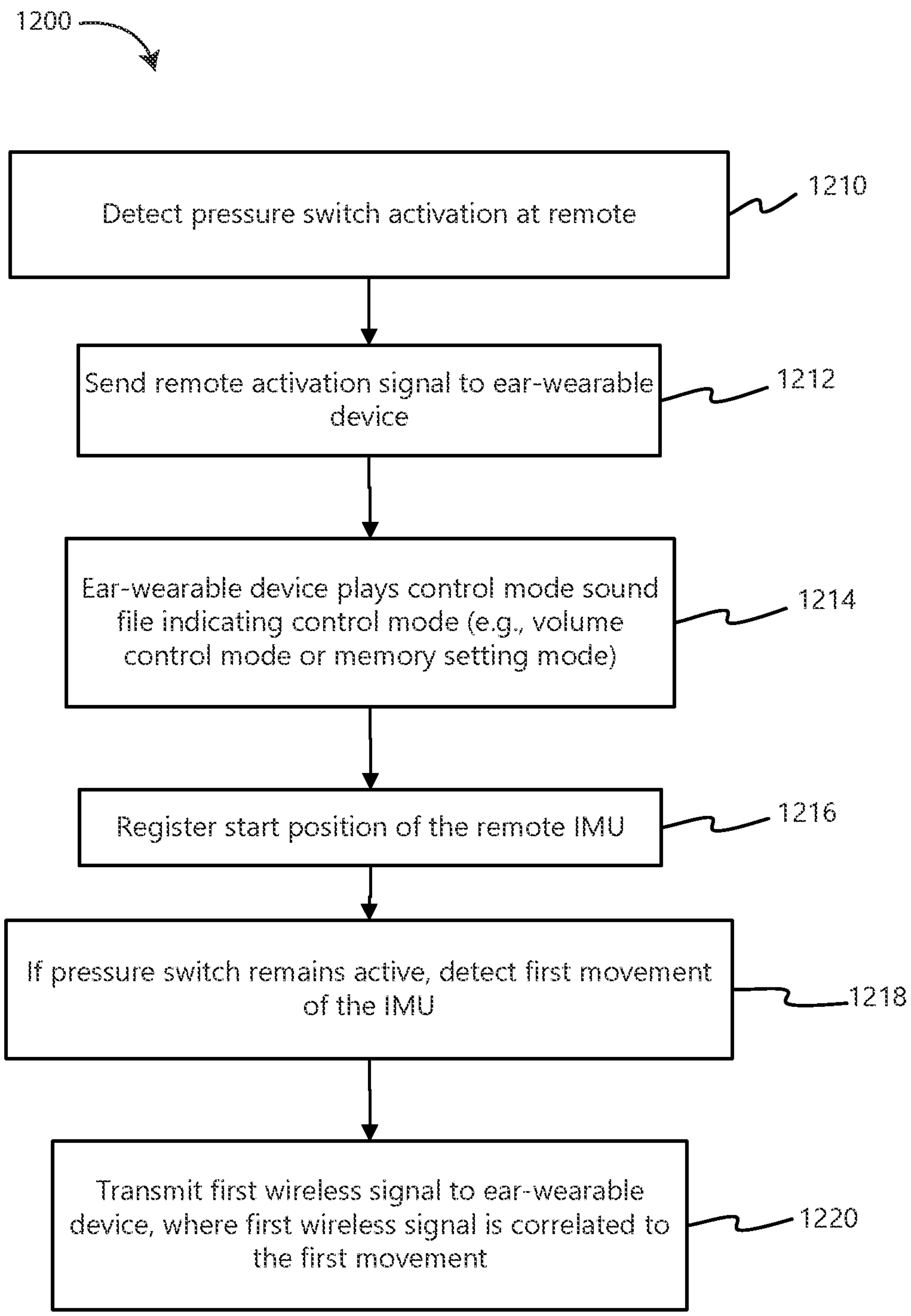
FIG. 12 is a method of initiating communication between an ear-wearable device and a remote-control module is shown in accordance with various embodiment herein in accordance with various embodiments herein.

Referring now to FIG. 12, a method of initiating communication between an ear-wearable device and a remote-control module is shown in accordance with various embodiment herein. The method 1200 can include the step 1210 of detecting pressure switch activation at remote-control module 104. In various embodiments, the pressure switch 514 of remote-control module 104 has an active state and an inactive state. To bring the pressure switch 514 into its active state, a threshold pressure is applied to the pressure switch. In various embodiments, the pressure switch is activated by compressing the second housing case 208, such as with a user's finger or thumb. Referring back to FIG. 5, the pressure switch 514 is configured to sit adjacent to the concave portion 310 of the second housing case 208. In various embodiments a small deflection (e.g., less than 1 mm) of the second housing case 208 towards the pressure switch 514 can bring the pressure switch 514 into its active state. FIG. 11 depicts one example of a user activating a pressure switch 514 by compressing the remote-control module 104 between the thumb 1136 and index finger 1138. In various embodiments, the remote-control module is in the active state when the pressure switch 514 remains depressed for a threshold amount of time, such as at least 1 second, at least 2 seconds, at least 3 seconds, or other time amounts, as the user executes a press and hold motion. However, other suitable means of activating the pressure switch are possible.

In embodiments where the remote-control module 104 contains a haptic feedback device 518, after detecting that the pressure switch 514 has entered the active state, the remote-control module 104 is configured to activate the haptic feedback device 518 to produce a press-confirming vibration motion to the hand of the user. In various embodiments, the haptic feedback device 518 is configured to immediately produce a press-confirming vibration motion to the hand of the user. In various embodiments, the haptic feedback device 518 is configured to produce a press-confirming vibration motion to the hand of the user with a substantially short delay such that that the user cannot perceive the delay. In some embodiments, the delay can be less than or equal to 100, 90, 80, 70, 60, 50, 40, 30, 20, or 10 milliseconds, or can be an amount falling within a range between any of the foregoing.

Referring to FIG. 12, the method 1200 can include the step 1212 of sending a remote activation signal to the ear-wearable device 102, upon detection of the remote-control module entering the active state. In various embodiments, the remote activation signal is sent to the communication device 1008 of the ear-wearable device 102 via remote-control wireless communication device 824. As discussed herein, any suitable wireless communication protocol or protocols can be used to transmit signals from the remote-control module 104 to the ear-wearable device 102 and vice versa including, but not limited to radio frequency transmission.

The method 1200 can include step 1214 of playing a sound file with the audio output device 1016 of the ear-wearable device 102 upon detection of a pressure switch activation. The sound file can communicate control information including the current control mode or a selected parameter related to the control of the ear-wearable device to the user. The ear-wearable device 102 can have one or more control modes including, but not limited to a volume control mode, a memory setting mode, and a standby mode. In some embodiments, the sound file contains spoken words verbally articulating the current control mode of the ear-wearable device (e.g., "volume mode," "memory mode," "You are in volume mode," or "You are in memory mode.") Alternatively, or in addition, the sound file contains one or more sounds (e.g., a tone or pattern of tones) with each sound being correlated to a control mode of the ear-wearable device.

The method 1200 can include step 1216 registering a start position of the IMU 622. The start position, as defined herein, is the orientation of the IMU relative to gravity at an activation time (e.g., the time at which the pressure switch enters an active state).

If the pressure switch remains in its active state, the method 1200 can include the step 1218 of detecting a first movement of the IMU 622. In various embodiments, the first movement is detected relative to the start position. In various embodiments, the pressure switch 514 remains in its active state for as long as at least the threshold pressure is applied to the pressure switch. In some embodiments, the remote-control module is in an active state when the pressure switch is in its active state. In some embodiments, the remote-control module can have a barometric pressure sensor to measure ambient air pressure. The barometric pressure sensor can provide height information which can be used to track up/down velocity motions in combination with the IMU.

Figure 13:
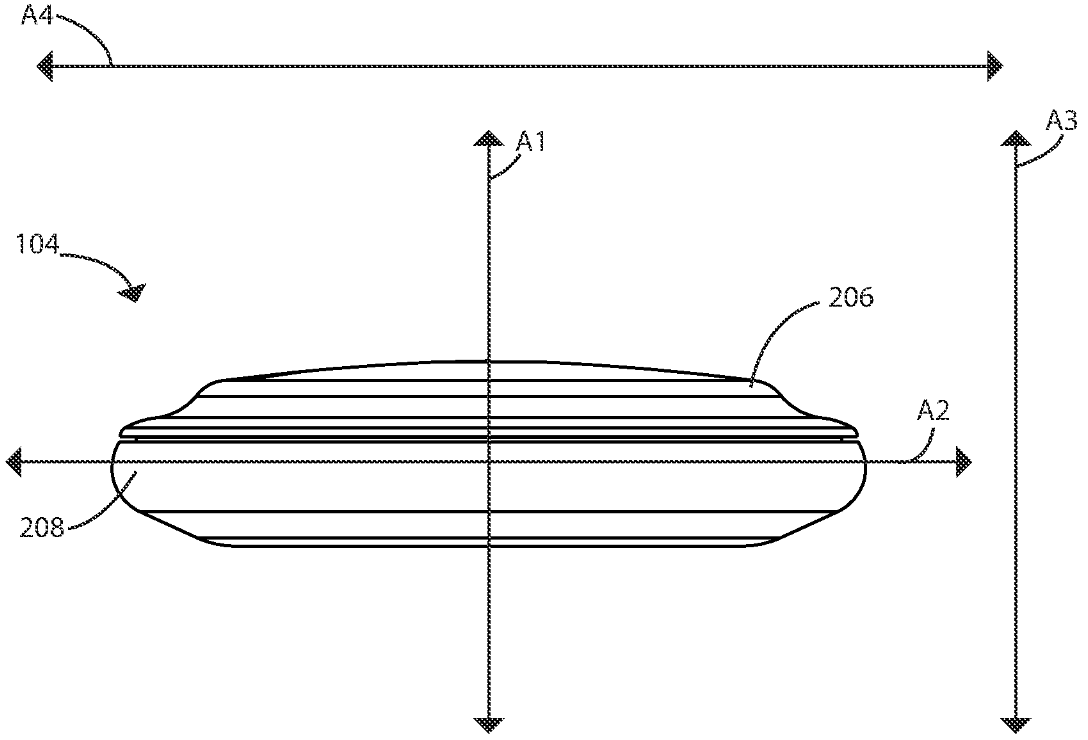
FIG. 13 is a front view of the remote-control module of FIG. 1 shown with examples of axes of movement of the remote-control module in accordance with various embodiments herein.

Referring to FIG. 13, examples of types of movements of the remote-control module will be described using axes shown in accordance with various embodiments herein. In various embodiments, the first movement can be a clockwise or counterclockwise rotation movement about an axis of a housing of the remote-control module including, but not limited to rotation about central axis A1 or rotation about a radial axis A2. A radial axis A2 is an axis of the housing that is perpendicular to the central axis A1 and passes through some part of the housing. In some embodiments, rotating the remote-control module around a radial axis of the housing A2 can including the user holding the remote-control module in their hand, such as between their thumb and forefinger with the fingertips centered on axis A1, with one fingertip positioned in concave portion 310 (FIG. 5), and performing a rotation movement with their wrist.

In various embodiments, the first movement can be a clockwise or counterclockwise rotation movement about an axis external to the housing 205 of the remote-control module 104 including, but not limited to axis A3 or axis A4. In some embodiments, rotating the remote-control module around an axis of the housing can including the user holding the remote-control module in their hand and performing a rotation movement with their arm or forearm, such as rotating at the shoulder or elbow. In various embodiments, the first movement can be an upward, downward, or sideways motion of the remote-control module 104. In various embodiments, the first movement can be an acceleration movement of the remote-control module 104.

In various embodiments, axis A3 or axis A4 can be different distances from the axis A1 or the axis A2, respectively, referred to as an axis distance. In some embodiments, the A3 axis distance or the A4 axis distance can be greater than or equal to 1 centimeter, 2 centimeters, 4 centimeters, 6 centimeters, 10 centimeters, or 15 centimeters. In some embodiments, the A3 axis distance or the A4 axis distance can be less than or equal to 30 centimeters or 15 centimeters. In some embodiments, the axis distance can fall within a range of 1 centimeter to 30 centimeters, or 1 centimeter to 20 centimeters, or 1 centimeter to 10 centimeters, or 1 centimeter to 6 centimeters, or 12 centimeters to 18 centimeters, or can be about 4 centimeters.

In embodiments where the remote-control module 104 contains a haptic feedback device 518, after detecting a first motion at the IMU, the remote-control module 104 is configured to activate the haptic feedback device 518 to produce a first movement confirming vibration motion.

Conversely, if the pressure switch leaves the active state (e.g., the pressure applied to the pressure switch drops below the threshold pressure) before a first motion is complete, the method can include terminating communication between the ear-wearable device and remote-control module 104. The method can include the step of playing a sound file at the audio output device 1016 of the ear-wearable device 102 that communication has been terminated. The method can include leaving the parameters of the ear-wearable device at their initial levels.

Referring to FIG. 12, the method 1200 can include the step 1220 of transmitting a first wireless signal to ear-wearable device upon detecting the first movement. In various embodiments, the first wireless signal is correlated to the first movement.

Figure 14:
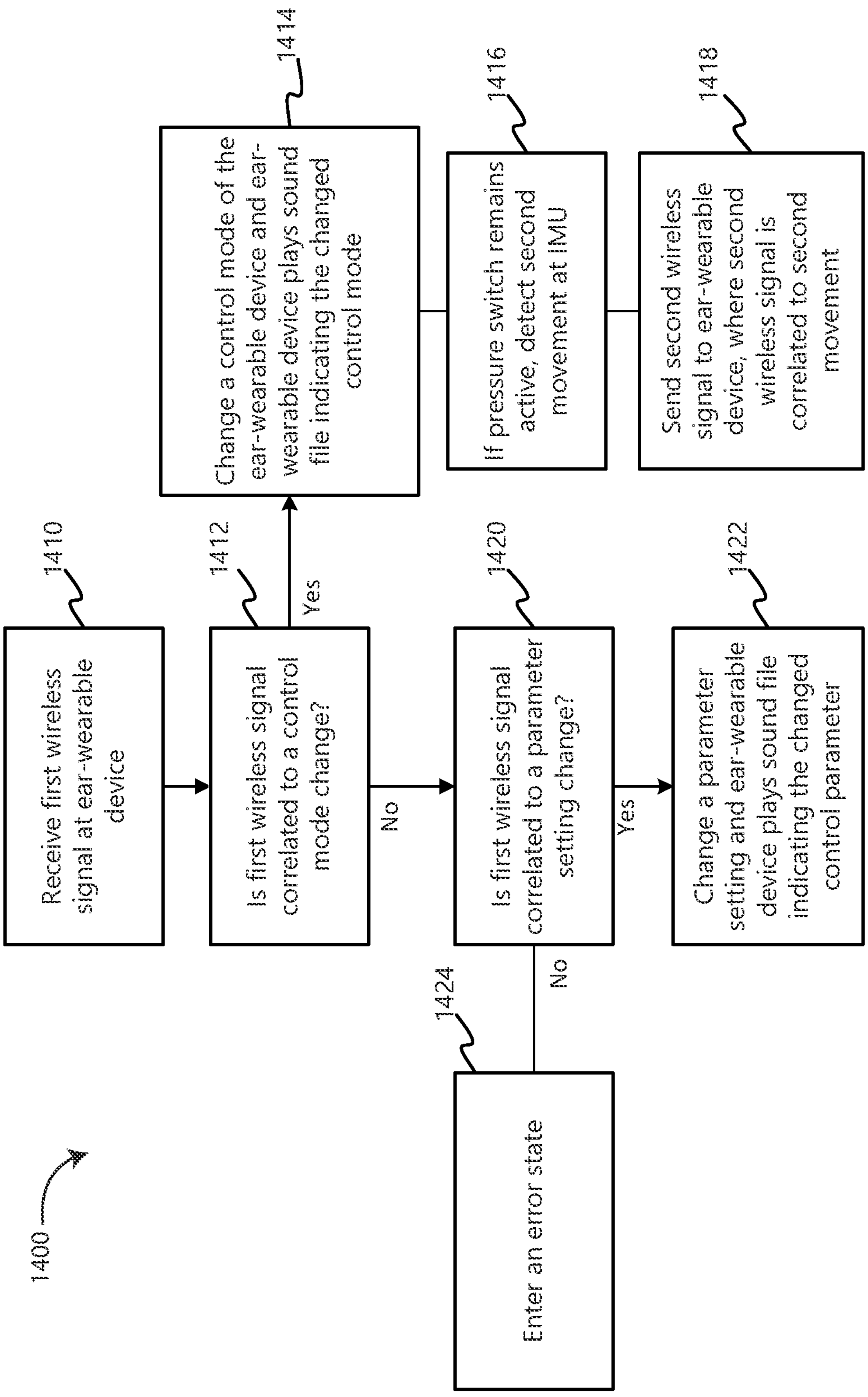
FIG. 14 is a method of controlling an ear-wearable device with a remote-control module in accordance with various embodiments herein.

Referring now to FIG. 14, a method of controlling an ear-wearable device with a remote-control module is shown in accordance with various embodiment herein. The method 1400 can include the step 1410 of receiving the first wireless signal at the first wireless communication device. In various embodiments, the first wireless signal is correlated to the first movement.

The method 1400 can include the step 1412 of determining if the wireless signal is correlated to a control mode change. Upon determining that the wireless signal is correlated to a control mode change, the method includes the step 1414 of changing a control mode of the ear-wearable device. For example, if the initial control mode of the ear-wearable device is a volume control mode, and the user wants to access the memory control mode, the user may perform a first motion associated with a control mode change. One example of a first motion is a double press of the pressure sensor or a shake of the remote-control module.

In various embodiments, step 1414 includes the ear-wearable device playing a sound file indicating the identity of the recently changed control mode upon changing a control mode. In the above example, the audio output device 1016 of the ear-wearable device 102 can communicate to the user that the ear-wearable device 102 is now in the memory control mode.

If pressure switch remains active (e.g., the pressure applied to the pressure switch does not drop below the threshold pressure), the method 1400 further includes the step 1416 of detecting a second movement at the IMU 622. The second movement can include any suitable movement or movements including but not limited a clockwise or counterclockwise rotation movement about an axis of a housing of the remote-control module, a clockwise or counterclockwise rotation movement about an axis external to the housing 205 of the remote-control module, an upward, downward, or sideways motion of the remote-control module 104, and an acceleration movement of the remote-control module 104. In various embodiments, the second movement is correlated to a parameter setting change, which will be described in greater detail herein.

If the pressure switch remains active (e.g., the pressure applied to the pressure remains above the threshold pressure), the method includes the step 1418 of sending second wireless signal to ear-wearable device. In various embodiments, the second wireless signal is correlated to the second movement. In some embodiments, if the pressure switch is no longer activated, communication between the remote-control module 104 and the ear-wearable device 102 is terminated.

In embodiments where the remote-control module 104 contains a haptic feedback device 518, upon detecting a second motion at the IMU, the remote-control module can be configured to activate the haptic feedback device 518 to produce a second movement confirming vibration motion.

Conversely, if the pressure switch leaves the active state (e.g., the pressure applied to the pressure switch drops below the threshold pressure) before a second motion is complete, the method can include terminating communication between the ear-wearable device and remote-control module 104. The method can include the step of playing a sound file at the audio output device 1016 of the ear-wearable device 102 to indicate that communication has been terminated. The method can include leaving the settings of the ear-wearable device at their initial levels.

If the wireless signal is not correlated to a control mode change, the method includes the step 1420 of determining if the first wireless signal correlates to a parameter setting change. In various embodiments, a parameter change can be a change in setting in any of the control modes. For instance, if the ear-wearable device 102 is in the volume control mode, a parameter change can be increasing or decreasing the volume of the ear-wearable device.

If the first wireless signal is correlated to a parameter setting change, the method includes the step 1422 changing a parameter setting. In the above example, changing the parameter setting can include increasing or decreasing the volume of the ear-wearable device as a function of the first movement. For instance, the first movement may be a clockwise twist of the remote-control module 104 to increase the volume of the ear-wearable device 102 or a counterclockwise twist of the remote-control module to decrease the volume of the ear-wearable device.

In various embodiments, step 1422 includes the ear-wearable device playing a sound file indicating the changed control parameter. In the above example, the ear-wearable device may verbally communicate the volume level to the user or play a series of tones corresponding to the volume level.

If the first wireless signal is neither correlated to a control mode change nor to a parameter setting change, the method includes step 1424 of entering an error state. In various embodiments, step 1424 can include one or more of activating a sound file containing an error message, prompting the user to repeat the first movement, or terminating communication between the remote-control module and the era wearable device.

In various embodiments, when the pressure switch leaves the active state (e.g., the pressure applied to the pressure switch drops below the threshold pressure), the ear-wearable device locks in the most recently selected parameter setting and/or control mode.

Exemplary Motions and Correlated Wireless Signals, Sound Files, and Haptic Feedback FIGS. 15-18 depict exemplary motions that a user may perform on the remote-control module. FIG. 19 provides examples of how different exemplary motions could correlate to wireless control signals, haptic feedback, and audio cues. Other motions, control signals, haptic feedback, and audio cues beyond the examples described herein could be used with the system and methods described herein. In addition, the specific correlations between motions, control signals, haptic feedback, and audio cues could be changed compared to what is shown and described herein. Any of the haptic feedback options and audio cue options could be used to indicate any of the control signals.

Figure 15:
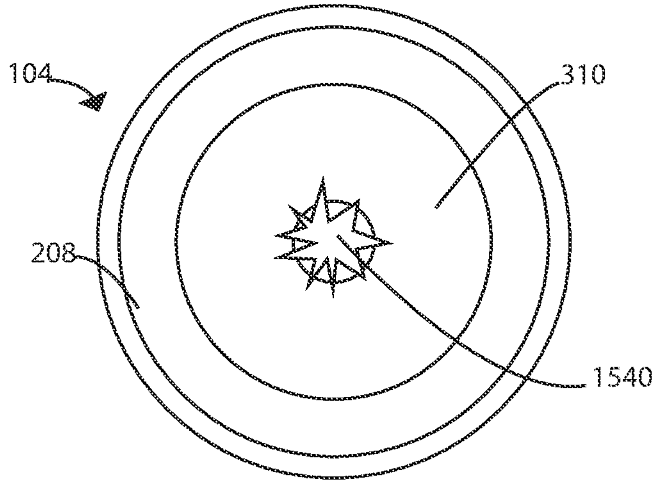
FIG. 15 is a schematic view of a press motion on a remote-control module in accordance with various embodiments herein.

Referring now to FIG. 15, a schematic view of a press motion on a remote-control module is shown in accordance with various embodiments herein. A press motion 1540 as defined herein is any motion that results in an activation followed by a deactivation on pressure switch 514. In various embodiments, a press motion includes applying and then releasing a compressive force to the second housing case 208 case with a finger or thumb. The press motion can interchangeably be referred to as a pinch motion. In one example, one of the user's fingertips is positioned against the first housing providing resistance to the pressure of a different fingertip that is positioned in the concave portion 310 of the first housing case 206.

Referring now to FIG. 19, the first row shows an example of a control signal, a haptic cue, and an audio cue that can be correlated to a press and hold sequence. A press and hold motion can cause a remote-control mode wireless signal to be sent to the ear-wearable device, thereby activating a remote-control mode, during which the ear-wearable device is actively receiving signals from the remote-control module correlated with motions detected at the remote-control device. In some embodiments, the entry into the remote-control mode can be indicated to the user by a vibration of the remote-control module, such as a vibration of a first length at a first frequency. In some embodiments, the entry into the remote-control mode is also indicated to the user by an audio cue being played at the hearing-assistance device. For example, a first tone can be played at ear-wearable device, where the first tone indicates that the remote-control mode is active. In addition, or alternatively, a first verbal statement can be played that indicates that the remote-control mode is active, such as "Now entering remote-control mode," "Remote mode" or "Remote mode on."

In various embodiments, a double-press sequence can be used to provide an ear-wearable device input to the user. The remote-control module is configured to detect a double-press sequence including a first activation, a deactivation, and a second activation of the pressure switch 514 within a first time interval. In some embodiments, the first time interval can be less than or equal to 6 seconds, 5 seconds, 4 seconds, 3 seconds, 2 seconds, or 1 seconds, or can be an amount falling within a range between any of the foregoing. In various embodiments, the remote-control module is configured to transmit a wireless signal correlated to the double-press sequence to the ear-wearable device. In various embodiments, the ear-wearable device is configured to receive the double-press wireless signal and play a sound file correlated to the double-press wireless signal. In an exemplary embodiment, the double press is used to change a control mode of the ear-wearable device and the ear-wearable device is configured to change from a first control mode to a second control mode based upon receiving the double-press wireless signal.

The second row of FIG. 19 shows an example of a control signal, a haptic cue, and an audio cue that can be correlated to a double-press sequence. In this example, a double-press sequence causes a control mode change signal to be sent that changes the ear-wearable device from a first control mode to a second control mode. For example, the ear-wearable device can change from a memory mode to a volume mode or from a volume mode to a memory mode. In some embodiments, the change of control modes can be indicated to the user by a vibration of the remote-control module, such as two discrete vibrations at a first length and a first frequency, or at a second length at a second frequency. In some embodiments, the change of control modes is also indicated to the user by an audio cue being played at the hearing-assistance device. For example, a second tone can be played at ear-wearable device, where the second tone indicates that control mode has changed. In addition, or alternatively, a first verbal statement can be played at the ear-wearable device that indicates that the change of control modes, such as "Now entering volume control mode," "Volume control mode," "Now entering memory control mode," or "Memory control mode."

Figure 16:
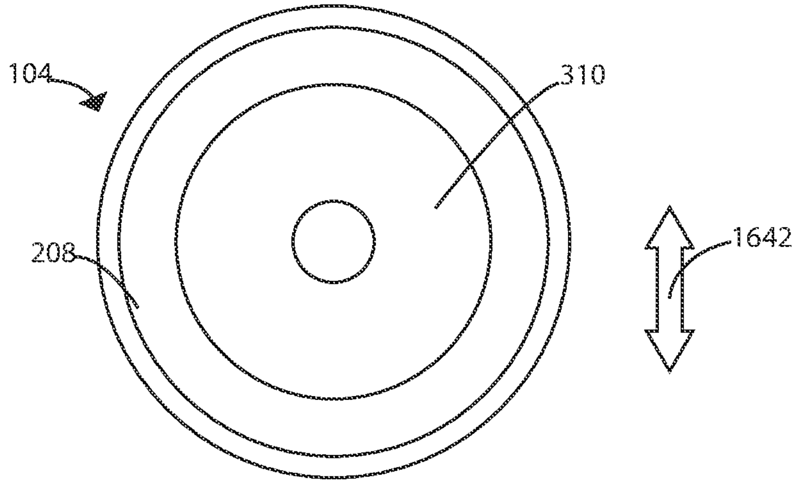
FIG. 16 is a schematic view of a shake motion on a remote-control module in accordance with various embodiments herein.

Referring now to FIG. 16, a schematic view of a shake motion of a remote-control module is shown in accordance with various embodiments herein. A shake motion 1642 as defined herein is any motion that results in an acceleration of the remote-control module 104 along any axis of motion. In some embodiments, a shake motion 1642 is only registered by the IMU 622 when the pressure switch 514 is in its active state.

In various embodiments, the remote-control module 104 is configured to detect a shake motion. In various embodiments, the remote-control module is configured to transmit a wireless signal correlated to the shake motion to the ear-wearable device. In various embodiments, the ear-wearable device is configured to receive the wireless signal correlated to the shake motion and play a correlated sound file. In an exemplary embodiment, the shake motion is used to change a control mode of the ear-wearable device and the ear-wearable device is configured to change from a first control mode to a second control mode based on the wireless signal correlated to the shake motion.

The third row of FIG. 19 shows an example of a control signal, a haptic cue, and an audio cue that can be correlated to a shake motion. In this example, a shake motion causes a control mode change signal to be sent that changes the ear-wearable device from a first control mode to a second control mode. The shake motion can be provided as an alternative to the double-press sequence as a different, additional way to change the control mode. Alternatively, the shake motion can be provided as the only way to change the control mode.

For example, the ear-wearable device can change from a memory mode to a volume mode or from a volume mode to a memory mode using a shake motion. In some embodiments, the change of control modes can be indicated to the user by a vibration of the remote-control module, such as a vibration of a second length at a second frequency. In some embodiments, the change of control modes is also indicated to the user by an audio cue being played at the hearing-assistance device. For example, a second tone can be played at ear-wearable device, where the second tone indicates that control mode has changed. In addition, or alternatively, a first verbal statement can be played at the ear-wearable device that indicates that the change of control modes, such as "Now entering volume control mode," "Volume control mode," "Now entering memory control mode," or "Memory control mode."

Figure 17:
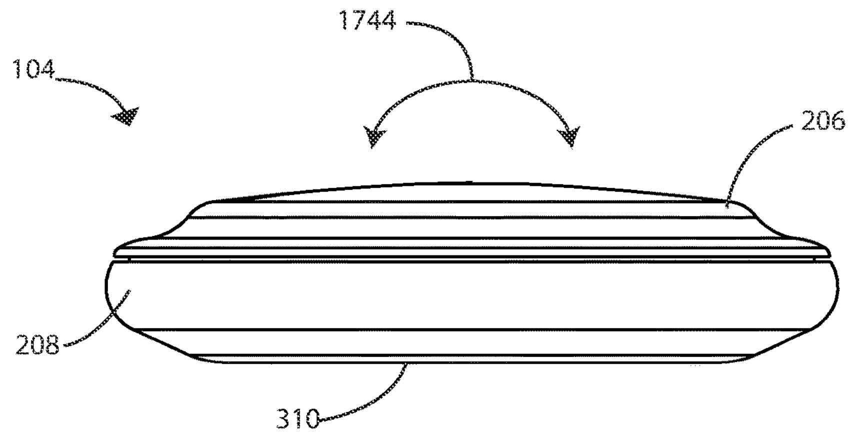
FIG. 17 is a schematic view of a twist motion on a remote-control module in accordance with various embodiments herein.

Referring now to FIG. 17, a schematic view of a twist motion on a remote-control module is shown in accordance with various embodiments herein. A twist motion 1744 as defined herein is any motion that results in a rotation of remote-control module 104 along any axis of the remote-control module. In some embodiments, a twist motion 1744 is only registered by the IMU 622 when the pressure switch 514 is in its active state. In various embodiments, the remote-control module 104 is configured to detect a twist motion. In various embodiments, the remote-control module is configured to transmit a wireless signal correlated to the twist motion to the ear-wearable device.

In various embodiments, the ear-wearable device is configured to receive the wireless signal correlated to the twist motion and play a sound file correlated to the twist motion. In an exemplary embodiment, the twist motion is used to change a parameter setting of the ear-wearable device and the ear-wearable device is configured to change from a first parameter setting to a second parameter setting based on the twist motion wireless signal.

Figure 18:
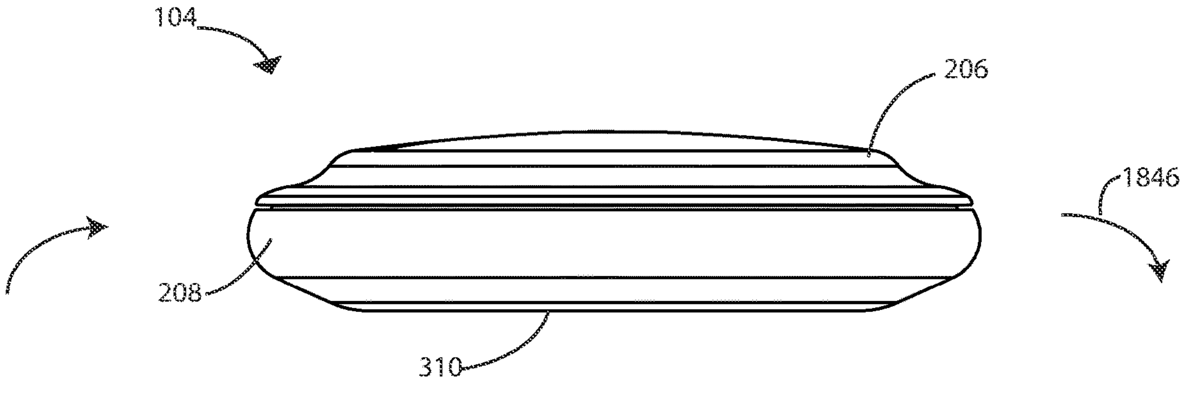
FIG. 18 is a schematic view of a rotation motion on a remote-control module in accordance with various embodiments herein.

Referring now to FIG. 18, a schematic view of a rotation motion on a remote-control module is shown in accordance with various embodiments herein. A rotation motion 1846 as defined herein is any motion that results in a rotation of remote-control module 104 along any axis external to the remote-control module. In some embodiments, a rotation motion 1846 is only registered by the IMU 622 when the pressure switch 514 is in its active state. In various embodiments, the remote-control module 104 is configured to detect a rotation motion. In various embodiments, the remote-control module is configured to transmit a rotation motion wireless signal related to the rotation motion to the ear-wearable device.

In various embodiments, the ear-wearable device is configured to receive the rotation wireless signal and play a sound file correlated to the rotation wireless signal. In an exemplary embodiment, the rotation motion is used to activate or deactivate a command mode of the ear-wearable device. The ear-wearable device commands can have any number command modes.

Control Modes and Parameter Settings

Volume Control Mode

In various embodiments, ear-wearable device 102 can include a volume control mode. Volume control mode is used to set the volume at which the audio output device 1016 of ear-wearable device 102 produces sound. In various embodiments, the volume control mode can include parameter settings correlating to different volume levels. In some embodiments, the volume parameter settings may include a low volume, medium volume, and high-volume setting. Alternatively, the volume control mode can include any suitable number of volume parameter settings. In some embodiments, the number of volume parameter settings can be greater than or equal to 2, 4, 6, 8, or 10 volume levels, or can be an amount falling within a range between any of the foregoing.

In an embodiment, the twist motion 1744 depicted by FIG. 17 can be performed to adjust the volume parameter setting. For instance, a clockwise twist of the remote-control module 104 can be used to increase the volume parameter setting and a counterclockwise twist of the remote-control module 104 can be used to decrease the volume parameter setting. The third and fourth rows of FIG. 19 show parameter change control signals, such as volume change control signals, as correlated to wrist rotation motion.

It should be noted that while the above example correlates a specific motion (twist) to a specific command (change of volume), it is possible for any motion to be correlated to any command. In embodiments where the remote-control module 104 contains a haptic feedback device 518, after detecting volume parameter setting change motion at the IMU, the remote-control module may be configured to activate the haptic feedback device 518 to produce a volume parameter change confirming vibration motion. In an exemplary embodiment, the vibrations produced by the haptic feedback device 518 increase in frequency and/or amplitude as the volume level increase and the vibrations produced by the haptic feedback device 518 decrease in frequency and/or amplitude as the volume level decreases.

In various embodiments, the ear-wearable device is configured to play a sound file indicating the changes in the volume parameter setting. In an exemplary embodiment the audio file may include playing an increasingly loud tone as the volume level increases and playing a decreasingly loud tone as the volume level decreases.

Alternatively, or in addition, the ear-wearable device can increase the sound of sounds in the user environment that are amplified by the ear-wearable devices as the volume level increases and decrease the sound as the volume level decreases.

Alternatively, or in addition, the ear-wearable device can play a verbal statement of the volume level, such as "Volume level 1" or "Volume level 4," to indicate the recently-selected volume parameter.

Memory Control Mode

In various embodiments, ear-wearable device 102 can include a memory control mode. Memory control mode is used to set the memory of the ear-wearable device. In various embodiments, the ear-wearable device can have any suitable number of memories. Each memory can store a set of parameters suitable for different environments (e.g., music for a concert, indoor settings, outdoor settings, and crowded settings), the memory control mode can include any suitable number of memories. In some embodiments, the number of memories can be greater than or equal to 2, 4, 6, 8, or 10 memories, or can be an amount falling within a range between any of the foregoing.

In an embodiment, the twist motion 1744 depicted by FIG. 17 can be performed to adjust the memory parameter setting. For instance, a clockwise twist of the remote-control module 104 can be used to change the memory parameter setting from memory 1 to memory 2 and a counterclockwise twist of the remote-control module 104 can be used to change the memory parameter from memory 2 to memory 1. The third and fourth rows of FIG. 19 show parameter change control signals, such as memory mode control, as correlated to wrist rotation motion, example haptic cues, and example audio cues.

In embodiments where the remote-control module 104 contains a haptic feedback device 518, after detecting memory parameter setting change at the IMU, the remote-control module is configured to activate the haptic feedback device 518 to produce a memory parameter change confirming vibration motion. In an exemplary embodiment the haptic feedback device 518 produces a vibration each time the memory setting parameter is adjusted. As indicated in FIG. 19, in one example, a vibration of a third length and third frequency is produced each time the memory setting parameter is adjusted.

In various embodiments, the ear-wearable device is configured to play a sound file indicating the changed in the memory parameter setting. In an exemplary embodiment the audio file may include an audible dictation of the currently selected memory setting parameter (e.g., "memory 1").

Command Modes

In various embodiments, the ear-wearable device can have one or more command modes. One such command mode is a noise reduction mode called Edge Mode. When in Edge Mode, the ear-wearable device is configured conduct an AI-based analysis of the environment to make immediate adjustments designed to improve speech audibility issues caused by background noise, obstructions, and the like.

Another example of a command mode is an activity tracking mode, where sensors in the ear-wearable device record information about the health and activity of the user. Another example of a command mode is a mask mode where setting of the ear-wearable device is designed to address speech clarity loss due to speaker's wearing face masks. Another example of a command mode is a restaurant mode with settings configured to assist with listening to speakers in conversation with the user while excluding conversations that are happening nearby or in the background of the user's environment.

In an embodiment, the rotation motion 1846 depicted by FIG. 18 can be performed to activate or deactivate a command mode. For instance, a clockwise rotation of the remote-control module 104 by the user's arm can be used to activate a command mode and a counterclockwise rotation of the remote-control module 104 can be used to deactivate a command mode.

Referring now to FIG. 19, the fifth and sixth rows show how rotation motions can be correlated to command mode change signals, haptic cues, and audio cues, in various embodiments.

In embodiments where the remote-control module 104 contains a haptic feedback device 518, after detecting command mode parameter setting change at the IMU, the remote-control module is configured to activate the haptic feedback device 518 to produce a command parameter change confirming vibration motion. In an exemplary embodiment the haptic feedback device 518 produces a vibration each time the command mode setting parameter is adjusted. For example, the haptic feedback device 518 can create a vibration of a fourth length and fourth frequency.

In various embodiments, the ear-wearable device is configured to play a sound file indicating the currently selected command mode parameter setting. In an exemplary embodiment the audio file may include an audible dictation of the command mode memory setting parameter (e.g., "Edge mode on" or "Activity tracking mode on.")

Many different methods are contemplated herein, including, but not limited to, methods of making, methods of using, and the like. Aspects of system/device operation described elsewhere herein can be performed as operations of one or more methods in accordance with various embodiments herein.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, many variations and modifications may be made while remaining within the spirit and scope herein.

What is claimed is:

1. A system comprising:

a. an ear-wearable device comprising a speaker, a microphone, a first processor, a first non-transitory computer memory, and a first wireless communication device;

b. a remote-control module comprising:

i. a remote control module housing, comprising a first housing case and a second case, the second housing case defining one or more barometric vents;

ii. a circuit board comprising a first side facing the first housing case, and a second side facing the second housing case, wherein the first side of the circuit board is sealed from the environment, and wherein the second side of the circuit board is in communication with the environment via the one or more barometric vents;

iii. a remote-control processor, iv. a remote-control wireless communication device, v. a pressure switch, wherein the pressure switch is configured to have an active state and an inactive state and to enter the active state when at least a threshold pressure is applied to a switch portion of a remote-control housing exterior;

vi. a remote-control inertial measurement unit (IMU);

vii. a remote-control non-transitory computer memory operatively connected to the remote-control processor, wherein the remote-control memory stores computer instructions for:

a. detecting the pressure switch entering the active state at an activation time by detecting at least the threshold pressure applied to the pressure switch for at least a threshold amount of time;

b. registering a start position of the IMU at the activation time;

c. if the pressure switch remains in the active state, detecting a first movement of the IMU; and d. if the pressure switch remains in the active state, transmitting a first wireless signal related to the first movement to the first wireless communication device, wherein the pressure switch remains in the active state after the activation time for as long as at least the threshold pressure is applied;

ii. wherein the first memory stores computer instructions for:

a. receiving the first wireless signal at the first wireless communication device; and b. based on the first wireless signal, changing a first setting of the ear-wearable device.

2. The system of claim 1, wherein the first memory stores further computer instructions for:

based on the first wireless signal, playing a first sound file at the speaker, wherein the first sound file provides control information to a wearer of the ear-wearable device.

3. The system of claim 2, wherein the control information provided by the first sound file is one of the group consisting of:

an identity of a current control mode of the ear-wearable device, an identity of a recently-changed control mode of the ear-wearable device, a current parameter setting of the ear-wearable device, a recently-changed parameter setting of the ear-wearable device, a current volume setting of the ear-wearable device, a recently-changed volume setting of the ear-wearable device, a current memory mode setting of the ear-wearable device, and a recently-changed memory mode setting of the ear-wearable device.

4. The system of claim 1, wherein the remote-control module further comprises a haptic feedback device configured to produce vibration motion, wherein the remote-control memory stores computer instructions for:

after detecting that the pressure switch has entered the active state, activating the haptic feedback device to produce a press-confirming vibration motion.

5. The system of claim 1, wherein the remote-control module further comprises a haptic feedback device configured to produce vibration motion, wherein the remote-control memory stores computer instructions for:

after detecting the first movement of the IMU, activating the haptic feedback device to produce a first-movement confirming vibration motion.

6. The system of claim 1, wherein the first movement is one of the group consisting of:

a shaking movement, a clockwise rotation movement about an axis of a housing of the remote-control module, a counterclockwise rotation movement about an axis of the housing of the remote-control module, a clockwise rotation movement about an axis external to the housing of the remote-control module, a counterclockwise rotation movement about an axis external to the housing of the remote-control module, an up movement, a down movement, and an acceleration movement.

7. The system of claim 1, wherein the first movement is a shaking movement, wherein the first memory stores computer instructions for:

upon receiving the first wireless signal, the ear-wearable device changes from a first control mode to a second control mode.

8. The system of claim 7, wherein the first control mode and second control mode are each selected from the group consisting of a volume control mode, a memory setting mode, and a standby mode.

9. The system of claim 1, wherein the first movement is from a start position to a first position, wherein the remote-control memory stores further computer instructions for:

detecting a second movement of the IMU from the first position to a second position; and transmitting a second wireless signal related to the second movement to the first wireless communication device.

10. The system of claim 1, the remote-control module further comprising a barometric pressure sensor to measure ambient air pressure, wherein the barometric pressure sensor provides height information which is used to track up or down velocity motions in combination with the IMU.

11. The system of claim 1, wherein the remote-control memory stores computer instructions for sending a remote activation signal to the ear-wearable device upon detecting the pressure switch entering the active state, wherein the speaker of the ear-wearable device plays an activation sound upon receiving the remote activation signal.

12. The system of claim 1, wherein the remote-control memory stores computer instructions for terminating communication between the ear-wearable device and remote-control module if the pressure switch leaves the active state before the first motion is complete.

13. A system comprising:

a. an ear-wearable device comprising a speaker, a microphone, a first processor, a first non-transitory computer memory, and a first wireless communication device;

b. a remote-control module comprising:

i. a remote control module housing, comprising a first housing case and a second case, the second housing case defining one or more barometric vents;

ii. a circuit board comprising a first side facing the first housing case, and a second side facing the second housing case, wherein the first side of the circuit board is sealed from the environment, and wherein the second side of the circuit board is in communication with the environment via the one or more barometric vents;

iii. a remote-control processor, iv. a remote-control wireless communication device, V. a pressure switch disposed on the second side of the circuit board, wherein the pressure switch is configured to have an active state and an inactive state and to enter the active state when at least a threshold pressure is applied to a switch portion of a remote-control housing exterior;

vi. a remote-control inertial measurement unit (IMU);

vii. a haptic feedback device configured to provide vibration motion;

viii. a remote-control non-transitory computer memory operatively connected to the remote-control processor, wherein the remote-control memory stores computer instructions for:

a. registering a start position of the IMU at the activation time;

b. upon registering the start position, detecting a first movement of the IMU;

c. transmitting a first wireless signal related to the first movement to the first wireless communication device; and d. after detecting that the pressure switch has entered the active state, activating the haptic feedback device to produce a press-confirming vibration motion; and vii. wherein the first memory stores computer instructions for:

a. receiving the first wireless signal at the first wireless communication device;

b. based on the first wireless signal, changing a first setting of the ear-wearable device; and c. based on the first wireless signal, playing a first sound file at the speaker, wherein the first sound file provides control information to a wearer of the ear-wearable device.

14. The system of claim 13, wherein the second housing case comprises a concave portion, and wherein a center of the pressure switch is substantially aligned with a vertex of the concave portion of the second housing case.

15. A method of operating an ear-wearable device with a remote-control module, the ear-wearable device comprising a first wireless communication device, the remote-control module comprising:

i. a remote control module housing, comprising a first housing case and a second case, the second housing case defining one or more barometric vents;
ii. a circuit board comprising a first side facing the first housing case, and a second side facing the second housing case, wherein the first side of the circuit board is sealed from the environment, and wherein the second side of the circuit board is in communication with the environment via the one or more barometric vents;
iii. a remote-control wireless communication device,
iv. a remote-control inertial measurement unit (IMU), and
V. a remote-control barometric pressure sensor, the method comprising:

detecting a first movement of the IMU at the remote-control module, wherein the barometric pressure sensor provides height information, and wherein detecting the first movement comprises tracking up or down velocity motions with the barometric pressure sensor in combination with the IMU;

transmitting a first wireless signal related to the first movement to the first wireless communication device with the remote-control wireless communication device;

receiving the first wireless signal at the first wireless communication device; and based on the first wireless signal, changing a first setting of the ear-wearable device.

16. The method of claim 15, further comprising:

based on the first wireless signal, playing a first sound file at a speaker of the ear-wearable device, wherein the first sound file provides control information to a wearer of the ear-wearable device.

17. The method of claim 16, wherein the control information provided by the first sound file is one of the group consisting of:

an identity of a current control mode of the ear-wearable device,
an identity of a recently-changed control mode of the ear-wearable device,
a current parameter setting of the ear-wearable device,
a recently-changed parameter setting of the ear-wearable device,
a current volume setting of the ear-wearable device,
a recently-changed volume setting of the ear-wearable device,
a current memory mode setting of the ear-wearable device, and
a recently-changed memory mode setting of the ear-wearable device.

18. The method of claim 15, the remote-control module further comprising a pressure switch, wherein the pressure switch is configured to have an active state and an inactive state and to enter the active state when at least a threshold pressure is applied to a switch portion of a remote-control housing exterior.

19. The method of claim 18, further comprising registering a start position of the IMU at an activation time when the pressure switch enters an active state, wherein the first movement is detected while the pressure switch remains in the active state after entering the active state at the activation time.

20. The method of claim 18, wherein the remote-control module further comprises a haptic feedback device configured to produce vibration motion, the method further comprising:

upon detecting that the pressure switch has entered the active state, activating the haptic feedback device to produce a press-confirming vibration motion.

* * * * *